US012638661B2

(12) United States Patent
Zhu et al.

(10) Patent No.: US 12,638,661 B2
(45) Date of Patent: May 26, 2026

(54) CAMERA OPTICAL LENS

(71) Applicant: AAC OPTICS (CHANGZHOU) CO., LTD., Changzhou City (CN)

(72) Inventors: Feng Zhu, Changzhou (CN); Shunda Zhou, Changzhou (CN)

(73) Assignee: AAC OPTICS (CHANGZHOU) CO., LTD., Changzhou City (CN)

( * ) Notice: Subject to any disclaimer, the term of this patent is extended or adjusted under 35 U.S.C. 154(b) by 286 days.

(21) Appl. No.: 18/621,054

(22) Filed: Mar. 28, 2024

(65) Prior Publication Data

US 2025/0164748 A1　May 22, 2025

(30) Foreign Application Priority Data

Nov. 21, 2023　(CN) ......................... 202311559034.X

(51) Int. Cl.
| | |
|---|---|
| *G02B 13/00* | (2006.01) |
| *G02B 9/62* | (2006.01) |
| *G02B 13/18* | (2006.01) |
| *G03B 30/00* | (2021.01) |

(52) U.S. Cl.
CPC ........... *G02B 13/0045* (2013.01); *G02B 9/62* (2013.01); *G02B 13/18* (2013.01); *G03B 30/00* (2021.01)

(58) Field of Classification Search
None
See application file for complete search history.

(56) References Cited

U.S. PATENT DOCUMENTS

| | | | | |
|---|---|---|---|---|
| 11,372,212 B2 * | 6/2022 | Lin | .......................... | G02B 9/62 |
| 2021/0382278 A1 * | 12/2021 | Shi | .......................... | G02B 13/18 |

* cited by examiner

*Primary Examiner* — Richard H Kim
(74) *Attorney, Agent, or Firm* — Wiersch Law Group

(57) ABSTRACT

Disclosed is a camera optical lens. The camera optical lens includes from an object side to an image side in sequence: a first lens having a positive refractive power; a second lens having a negative refractive power; a third lens having a positive refractive power; a fourth lens having a negative refractive power; a fifth lens having a positive refractive power; a sixth lens having a negative refractive power; wherein the camera lens satisfies the following conditions: $2.00 \le f3/f \le 6.00$; $-2.00 \le f5/f6 \le -0.79$; $-5.00 \le R7/R8 \le -1.00$; $-0.90 \le R9/R10 \le -0.20$; $0.25 \le d2/d3 \le 1.00$. The camera optical lens has good optical performance, and can meet the design requirements for large aperture, wide-angle and ultra-thin.

10 Claims, 12 Drawing Sheets

Longitudinal aberration mm

Longitudinal aberration mm

CAMERA OPTICAL LENS

CROSS REFERENCE TO RELATED APPLICATIONS

The present application claims the benefit of priority under the Paris Convention to Chinese Patent Application No. CN202311559034.X, entitled "CAMERA OPTICAL LENS," filed on Nov. 21, 2023, which is incorporated by reference herein in its entirety.

TECHNICAL FIELD

The present disclosure relates to the field of optical lens, in particular to a camera optical lens suitable for handheld devices, such as smart phones and digital cameras, and camera devices such as monitors, PC lens, and vehicle-mounted lens.

BACKGROUND

With the rise of various smart devices in recent years, the demand for miniaturized camera optical lenses is increasing, and due to the reduction of the pixel size of light-sensitive devices, coupled with the development trend of electronic products with good functions, thin, lightweight, and portable appearance, miniaturized camera optical lenses with good imaging quality have become the mainstream of the current market. In order to obtain a better image quality, a multi-piece lens structure is mostly equipped. Moreover, with the development of technology and the increase of diversified needs of users, the pixel area of light-sensitive devices is constantly shrinking, and the requirements of the system for imaging quality are constantly improving, a camera optical lens with six lenses gradually appears in the lens design. There is an urgent need for camera optical lenses with good optical performance, large aperture, wide angle and ultra-thin.

SUMMARY

In response to the foregoing technical problems, an object of embodiments of the present disclosure is to provide a camera optical lens, which can have good optical performance, and meet the design requirements for large aperture, wide-angle and ultra-thin.

To resolve the foregoing technical problems, the present disclosure provides a camera optical lens, comprising, from an object side to an image side in sequence: a first lens having a positive refractive power; a second lens having a negative refractive power; a third lens having a positive refractive power; a fourth lens having a negative refractive power; a fifth lens having a positive refractive power; a sixth lens having a negative refractive power; wherein the camera lens satisfying the following conditions: $2.00 \leq f3/f \leq 6.00$; $-2.00 \leq f5/f6 \leq -0.79$; $-5.00 \leq R7/R8 \leq -1.00$; $-0.90 \leq R9/R10 \leq -0.20$; $0.25 \leq d2/d3 \leq 1.00$; where, f represents a focal length of the camera optical lens; f3 represents a focal length of the third lens; f5 represents a focal length of the fifth lens; f6 represents a focal length of the sixth lens; R7 represents a central curvature radius of the object side surface of the fourth lens; R8 represents a central curvature radius of the image side surface of the fourth lens; R9 represents a central curvature radius of the object side surface of the fifth lens; R10 represents a central curvature radius of the image side surface of the fifth lens; d2 represents a distance on-axis from an image side surface of the first lens to an object side surface of the second lens; d3 represents a thickness on-axis of the second lens.

As an improvement, wherein the camera optical lens further satisfies the following conditions: $0.09 \leq d1/TTL \leq 0.15$; where, d1 represents a thickness on-axis of the first lens; TTL represents a total optical length of the camera optical lens.

As an improvement, wherein the camera optical lens further satisfies the following conditions: $-80.00 \leq f4/d7 \leq -25.00$; where, f4 represents a focal length of the fourth lens; d7 represents a thickness on-axis of the fourth lens.

As an improvement, wherein the first lens has a convex object side surface at the proximal axis and a concave image side surface at the proximal axis; and the camera optical lens further satisfies the following conditions: $0.48 \leq f1/f \leq 1.52$; $-3.55 \leq (R1+R2)/(R1-R2) \leq -1.09$; where, f1 represents a focal length of the first lens; R1 represents a central curvature radius of the object side surface of the first lens; R2 represents a central curvature radius of the image side surface of the first lens.

As an improvement, wherein the second lens has a convex object side surface at the proximal axis and a concave image side surface at the proximal axis; and the camera optical lens further satisfies the following conditions: $-4.90 \leq f2/f \leq -1.24$; $1.36 \leq (R3+R4)/(R3-R4) \leq 5.66$; $0.02 \leq d3/TTL \leq 0.09$; where, f2 represents a focal length of the second lens; R3 represents a central curvature radius of the object side surface of the second lens; R4 represents a central curvature radius of the image side surface of the second lens; TTL represents a total optical length of the camera optical lens.

As an improvement, wherein the third lens has a convex object side surface at the proximal axis; and the camera optical lens further satisfies the following conditions: $-2.65 \leq (R5+R6)/(R5-R6) \leq -0.51$; $0.03 \leq d5/TTL \leq 0.16$; where, R5 represents a central curvature radius of the object side surface of the third lens; R6 represents a central curvature radius of the image side surface of the third lens; d5 represents a thickness on-axis of the third lens; TTL represents a total optical length of the camera optical lens.

As an improvement, wherein the fourth lens has a concave object side surface at the proximal axis and a concave image side surface at the proximal axis; and the camera optical lens further satisfies the following conditions: $-15.45 \leq f4/f \leq -1.66$; $0.00 \leq (R7+R8)/(R7-R8) \leq 1.00$; $0.04 \leq d7/TTL \leq 0.13$; where, f4 represents a focal length of the fourth lens; d7 represents a thickness on-axis of the fourth lens; TTL represents a total optical length of the camera optical lens.

As an improvement, wherein the fifth lens has a convex object side surface at the proximal axis and a convex image side surface at the proximal axis; and the camera optical lens further satisfies the following conditions: $0.44 \leq f5/f \leq 1.95$; $-1.32 \leq (R9+R10)/(R9-R10) \leq -0.04$; $0.05 \leq d9/TTL \leq 0.17$; where, d9 represents a thickness on-axis of the fifth lens; TTL represents a total optical length of the camera optical lens.

As an improvement, wherein the sixth lens has a convex object side surface at the proximal axis and a concave image side surface at the proximal axis; and the camera optical lens further satisfies the following conditions: $-2.21 \leq f6/f5-0.44$; $0.50 \leq (R11+R12)/(R11-R12) \leq 3.53$; $0.04 d11/TTL \leq 0.15$; where, R11 represents a central curvature radius of the object side surface of the sixth lens; R12 represents a central curvature radius of the image side surface of the sixth lens; d11 represents a thickness on-axis of the sixth lens; TTL represents a total optical length of the camera optical lens.

As an improvement, wherein the camera optical lens has a field of view; and the camera optical lens further satisfies the following conditions: FOV≥76.44°; FOV represents the field of view of the camera optical lens.

The beneficial effect of the present disclosure are as follows. The camera optical lens designed according to the present disclosure has excellent optical characteristics, and the camera optical lens can meet the design requirements for large aperture, wide-angle and ultra-thin. The camera optical lens is particularly suitable for in-vehicle lenses, cellular phone camera lens assemblies and WEB camera lenses, which includes camera elements such as CCD (Charge-Coupled Device), CMOS (Complementary Metal-Oxide-Semiconductor) and other camera elements for high pixels.

BRIEF DESCRIPTION OF THE DRAWINGS

In order to more clearly illustrate the technical solutions in the embodiments of the present disclosure, the accompanying drawings to be used in the description in the embodiments will be briefly introduced hereinafter, and the following is a brief introduction of the drawings required in the description of the embodiments. It is obvious that the accompanying drawings in the description hereinafter are only some of the embodiments of the present disclosure, and that for a person having ordinary skill in the art, other accompanying drawings can also be obtained according to these drawings without creative labor.

DETAILED DESCRIPTION OF THE EMBODIMENTS

To make the technical problems to be solved, technical solutions and beneficial effects of the present disclosure more apparent, the present disclosure is described in further detail together with the figure and the embodiments. It should be understood the specific embodiments described hereby is only to explain the present disclosure, not intended to limit the disclosure. It is understandable to a person having ordinary skill in the art that, in various embodiments of the disclosure, many technical details are proposed to enable the reader to better understand the present disclosure. However, even without the technical details and various variations and modifications based on the following embodiments, the technical solution claimed to be protected by the present disclosure can be realized.

Embodiment 1

Figure 1:
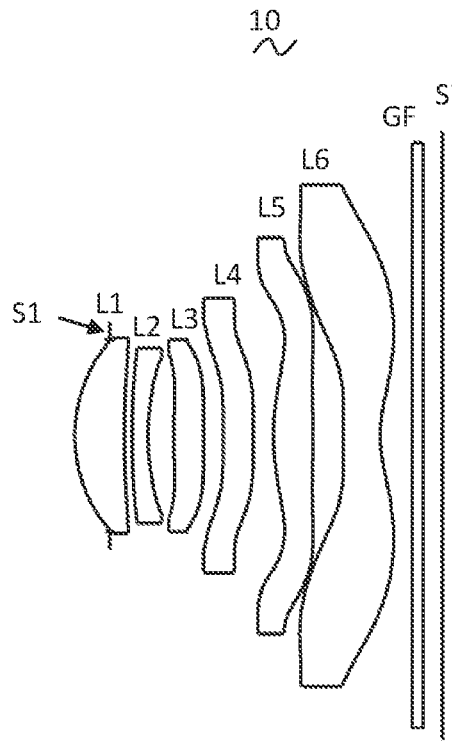
FIG. 1 is a schematic diagram of a camera optical lens in accordance with a first embodiment of the present disclosure.

Embodiment 1 may also be described in the following description as a first embodiment. Referring to FIG. 1, the present disclosure provides a camera optical lens 10. FIG. 1 shows the camera optical lens 10 in the first embodiment of the present disclosure, which includes six lenses in total. Specifically, from the object side to the image side, the camera optical lens 10 includes in sequence: a first lens L1, an aperture S1, a second lens L2, a third lens L3, a fourth lens L4, a fifth lens L5, and a sixth lens L6. Optical elements like an optical filter GF may be arranged between the sixth lens L6 and the image surface Si.

In this embodiment, the first lens L1 is made of plastic material. The second lens L2 is made of plastic material. The third lens L3 is made of plastic material. The fourth lens L4 is made of plastic material. The fifth lens L5 is made of plastic material. The sixth lens L6 is made of plastic material. In other optional embodiments, the respective lens of the camera optical lens 10 may also be made of other materials.

In this embodiment, the focal length of the camera optical lens 10 is defined as f, and the focal length of the third lens L3 is defined as f3. The camera optical lens 10 satisfies the following condition: $2.00 \leq f3/f \leq 6.00$, which fixes the ratio of the focal length f3 of the third lens L3 to the total focal length f of the system (i.e., the focal length f of the camera optical lens 10). When the condition is satisfied, the amount of the field curvature of the system can be effectively balanced, so that the amount of the field curvature offset of the center field of view is less than 0.03 mm.

In this embodiment, the focal length of the fifth lens L5 is defined as f5, and the focal length of the sixth lens L6 is defined as f6. The following condition should be satisfied: $-2.00 \leq f5/f6 \leq -0.79$, which fixes the ratio of the focal length f5 of the fifth lens L5 to the focal length f6 of the sixth lens L6. When the condition is satisfied, the appropriate distribution of the optical focal length of the system results in that the system has better imaging quality and lower sensitivity.

In this embodiment, the central curvature radius of the object side surface of the fourth lens L4 is defined as R7, and the central curvature radius of the image side surface of the fourth lens L4 is defined as R8. The following condition should be satisfied:

$-5.00 \leq R7/R8 \leq -1.00$, by which, the shape of the fourth lens L4 is fixed, the distortion and astigmatism of the camera optical lens 10 can be effectively corrected, so that the distortion is less than or equal to 5%, the possibility of dark corners can be reduced.

In this embodiment, the central curvature radius of the object side surface of the fifth lens L5 is defined as R9, and the central curvature radius of the image side surface of the fifth lens L5 is defined as R10. The following condition $-0.90 \leq R9/R10 \leq -0.20$ should be satisfied, which fixes the shape of the fifth lens L5. When the condition is satisfied, the degree of deflection of light passing through the fifth lens L5 can be eased, and the lateral color can be effectively corrected, so that the lateral color is less than or equal to 6.0 m.

In this embodiment, the distance on-axis between the image side surface of the first lens L1 and the object side surface of the second lens L2 is defined as d2, and the thickness on-axis of the second lens L2 is defined as d3. The following condition should be satisfied: $0.25 \leq d2/d3 \leq 1.00$, which fixes the ratio of the air interval between the first lens L1 and the second lens L2 (i.e., the distance on-axis d2 between the image side surface of the first lens L1 and the object side surface of the second lens L2) to the thickness on-axis d3 of the second lens L2. When the condition is satisfied, the air interval between the first lens L1 and the second lens L2 can be reasonably distributed, which is conducive to reducing the difficulty of assembly in the actual production process and improving the yield rate.

In this embodiment, the thickness on-axis of the first lens L1 is defined as d1, and the total optical length of the camera optical lens 10 is defined as TTL. The following condition should be satisfied: $0.09 \leq d1/TTL \leq 0.15$, which fixes the ratio of between the thickness on-axis d1 of the first lens L1 to the total optical length TTL of the system. When the condition is satisfied, the lateral color can be corrected to ensure the imaging quality, and the total optical length TTL of the system can be effectively controlled.

In this embodiment, the focal length of the fourth lens L4 is defined as f4, and the thickness on-axis of the fourth lens L4 is defined as d7. The following condition should be satisfied: $-80.00 \leq f4/d7 \leq -25.00$, which fixes the ratio of the negative refractive power of the fourth lens L4 to the thickness on-axis d7 of the fourth lens L4. When the condition is satisfied, it is beneficial for buffering changes of the angle of incidence of large viewing angle light, so that the large viewing angle light can smoothly pass though the optical lens 10. At the same time, the strength of refractive power of the fourth lens L4 can be maintained for improving the lateral color.

In this embodiment, the first lens L1 has a convex object side surface at the proximal axis and a concave image side surface at the proximal axis. The first lens L1 has a positive refractive power. In other optional embodiments, the object side surface and the image side surface of the first lens L1 may also be provided with other concave and convex distributions.

The focal length of the camera optical lens 10 is defined as f, and the focal length of the first lens L1 is defined as f1. The following condition should be satisfied: $0.48 \leq f1/f \leq 1.52$. By controlling the positive focal power of the first lens L1 in a reasonable range, it is beneficial for correcting the lateral color of the optical system (i.e., the camera optical lens 10). Preferably, the following condition shall be satisfied, $0.76 \leq f1/f \leq 1.22$.

The central curvature radius of the object side surface of the first lens L1 is defined as R1, and the central curvature radius of the image side surface of the first lens L1 is defined as R2. The following condition should be satisfied: $-3.55 \leq (R1+R2)/(R1-R2) \leq -1.09$, by which, the shape of the first lens L1 is reasonably controlled, it is beneficial for efficiently correcting the spherical aberration of the system. Preferably, the following condition shall be satisfied, $-2.22 \leq (R1+R2)/(R1-R2) \leq -1.36$.

In this embodiment, the second lens L2 has a convex object side surface at the proximal axis and a concave image side surface at the proximal axis. The second lens L2 has a negative refractive power. In other optional embodiments, the object side surface and the image side surface of the second lens L2 may also be provided with other concave and convex distributions.

The focal length of the camera optical lens 10 is defined as f, and the focal length of the second lens L2 is defined as f2. The following condition should be satisfied:

$-4.90 \leq f2/f5 -1.24$. By controlling the negative focal power of the second lens L2 in a reasonable range, it is beneficial for correcting the lateral color of the optical system. Preferably, the following condition shall be satisfied, $-3.06 \leq f2/f \leq -1.55$ is satisfied.

The central curvature radius of the object side surface of the second lens L2 is defined as R3, and the central curvature radius of the image side surface of the second lens L2 is defined as R4. The following condition should be satisfied: $1.36 \leq (R3+R4)/(R3-R4) \leq 5.66$, which fixes the shape of the second lens L4. When the condition is satisfied, it is beneficial for correcting the aberration of the image of the off axis drawing angle, among other things, as the camera optical lens 10 with ultra-thin and wide angle is developed. Preferably, the following condition shall be satisfied, $2.18 \leq (R3+R4)/(R3-R4) \leq 4.53$ is satisfied.

The thickness on-axis of the second lens L2 is defined as d3, and the total optical length of the camera optical lens 10 is defined as TTL. The following condition should be satisfied: $0.02 \leq d3/TTL \leq 0.09$, by which, it is beneficial for the realization of miniaturization. Preferably, the following condition shall be satisfied, $0.02 \leq d3/TTL \leq 0.07$.

In this embodiment, the third lens L3 has a convex object side surface at the proximal axis, and the third lens L3 has a convex image side surface or a concave image side surface at the proximal axis. The third lens L3 has a positive refractive power. In other optional embodiments, the object side surface and the image side surface of the third lens L3 may also be provided with other concave and convex distributions.

The central curvature radius of the object side surface of the third lens L3 is defined as R5, and the central curvature radius of the image side surface of the third lens L3 is defined as R6. The following condition should be satisfied: $-2.65 \leq (R5+R6)/(R5-R6) \leq -0.51$, which fixes the shape of the third lens L3. When the condition is satisfied, it is beneficial for correcting the aberration of the image of the off axis drawing angle, among other things, as the camera optical lens 10 with ultra-thin and wide angle is developed. Preferably, the following condition shall be satisfied, $-1.66 \leq (R5+R6)/(R5-R6) \leq -0.64$.

The thickness on-axis of the third lens L3 is defined as d5, and the total optical length of the camera optical lens 10 is defined as TTL. The following condition should be satisfied: $0.03 \leq d5/TTL \leq 0.16$, by which, it is beneficial for the realization of miniaturization. Preferably, the following condition shall be satisfied, $0.05 \leq d5/TTL \leq 0.13$.

In this embodiment, the fourth lens L4 has a concave object side surface at the proximal axis and a concave image side surface at the proximal axis. The fourth lens L4 has a negative refractive power. In other optional embodiments, the object side surface and the image side surface of the fourth lens L4 may also be provided with other concave and convex distributions.

The focal length of the camera optical lens 10 is defined as f, and the focal length of the fourth lens L4 is defined as f4. The following condition: $-15.45 \leq f4/f \leq -1.66$ should be satisfied. By distributing the focal power of the fourth lens L4 appropriately, the system can have better imaging quality and lower sensitivity. Preferably, the following condition shall be satisfied, $-9.65 \leq f4/f \leq -2.08$.

The central curvature radius of the object side surface of the fourth lens L4 is defined as R7, and the central curvature radius of the image side surface of the fourth lens L4 is defined as R8. The following condition should be satisfied: $0.00 \leq (R7+R8)/(R7-R8) \leq 1.00$, which fixes the shape of the fourth lens L4. When the condition is satisfied, it is beneficial for correcting the aberration of the image of the off axis drawing angle, among other things, as the camera optical lens 10 with ultra-thin and wide angle is developed. Preferably, the following condition shall be satisfied, $0.00 \leq (R7+R8)/(R7-R8) \leq 0.80$.

The thickness on-axis of the fourth lens L4 is defined as d7, and the total optical length of the camera optical lens 10 is TTL. The following relationship is satisfied: $0.04 \leq d7/TTL \leq 0.13$, by which, it is beneficial for the realization of miniaturization. Preferably, $0.06 \leq d7/TTL \leq 0.10$.

In this embodiment, the fifth lens L5 has a convex object side surface at the proximal axis and a convex image side at the proximal axis. The fifth lens L5 has a positive refractive power. In other optional embodiments, the object side surface and the image side surface of fifth lens L5 may also be provided with other concave and convex distributions.

The focal length of the camera optical lens 10 is defined as f, and the focal length of the fifth lens L5 is defined as f5. The following condition should be satisfied: $0.44 \leq f5/f \leq 1.95$. By distributing the focal power of the fifth lens L5 appropriately, the system can have better imaging quality and lower sensitivity. Preferably, the following condition shall be satisfied, $0.70 \leq f5/f \leq 1.56$.

The central curvature radius of the object side surface of the fifth lens L5 is defined as R9, and the central curvature radius of the image side surface of the fifth lens L5 is defined as R10. The following condition should be satisfied: $-1.32 \leq (R9+R10)/(R9-R10) \leq -0.04$, which fixes the shape of the fifth lens L5. When the condition is satisfied, it is beneficial for correcting the aberration of the image of the off axis drawing angle, among other things, with the development of ultra-thin and wide angle. Preferably, the following condition shall be satisfied, $-0.83 \leq (R9+R10)/(R9-R10) \leq -0.05$.

The thickness on-axis of the fifth lens L5 is defined as d9, and the total optical length of the camera optical lens 10 is defined as TTL. The following condition should be satisfied: $0.05 \leq d9/TTL \leq 0.17$, by which, it is beneficial for the realization of miniaturization. Preferably, the following condition shall be satisfied, $0.08 \leq d9/TTL \leq 0.14$.

In this embodiment, the sixth lens L6 has a convex object side surface at the proximal axis and a concave image side surface at the proximal axis. The sixth lens L6 has a negative refractive power. In other optional embodiments, the object side surface and the image side surface of the sixth lens L6 may also be provided with other concave and convex distributions.

The focal length of the camera optical lens 10 is defined as f, and the focal length of the sixth lens L6 is defined as f6. The following condition should be satisfied: $-2.21 \leq f6/f \leq -0.44$. By distributing the focal power of the sixth lens L6 appropriately, the system can have better imaging quality and lower sensitivity. Preferably, the following condition shall be satisfied, $-1.38 \leq f6/f \leq -0.55$.

The central curvature radius of the object side surface of the sixth lens L6 is defined as R11, and the central curvature radius of the image side surface of the sixth lens L6 is defined as R12. The following condition should be satisfied: $0.50 \leq (R11+R12)/(R11-R12) \leq 3.53$, which fixes the shape of the sixth lens L6. When the condition is satisfied, it is beneficial for correcting the aberration of the image of the off axis drawing angle, among other things, with the development of ultra-thin and wide angle. Preferably, the following condition shall be satisfied, $0.80 \leq (R11+R12)/(R11-R12) \leq 2.83$.

The thickness on-axis of the sixth lens L6 is defined as d11, and the total optical length of the camera optical lens 10 is defined as TTL. The following condition should be satisfied: $0.04 \leq d11/TTL \leq 0.15$, by which, it is beneficial for the realization of miniaturization. Preferably, the following condition shall be satisfied, $0.06 \leq d11/TTL \leq 0.12$.

In this embodiment, the vision field angle (FOV, i.e., field of view) of the camera optical lens 10 is greater than or equal to $76.44°$, thereby realizing wide-angle, and the camera optical lens 10 can have good imaging performance.

In this embodiment, the image height of the camera optical lens 10 is defined as IH, and the total optical length of the camera optical lens 10 is defined as TTL. The following condition should be satisfied: $TTL/IH \leq 1.45$, which is beneficial for the realization of miniaturization.

In this embodiment, the camera optical lens 10 has an aperture value FNO, which is less than or equal to 1.70, thereby realizing a large aperture and good imaging performance of the camera optical lens 10.

The camera optical lens 10 has good optical performance and can meet the design requirements of a large aperture, wide angle and ultra-thin. Based on the characteristics of the camera optical lens 10, the camera optical lens 10 is particularly suitable for in-vehicle lenses, cellular phone camera lens assemblies and WEB camera lenses, which includes camera elements such as CCD and CMOS for high pixel.

The camera optical lens 10 of the present disclosure will be described below by way of examples. The various symbols recorded in each example are shown below. The unit of the focal length, distance on-axis, center curvature radius, thickness on-axis, location of inflection point, and location of stationary point is mm.

TTL: Total optical length (the distance on-axis from the object side surface of the first lens L1 to the image Si), and the unit of TTL is mm;

Aperture value FNO: a ratio of the effective focal length of the camera optical lens to the diameter of the incident pupil.

Preferably, the camera optical lens 10 may also be provided with one or both of at least an inflection point and at least a stationary point on one or both of the object side surface and the image side surface, which is beneficial for meeting the requirements of high imaging quality. The specific embodiments are described below.

Table 1 shows the design data of the camera optical lens 10 in the first embodiment of the present disclosure.

TABLE 1

|  | R |  | d |  | nd |  | vd |
| --- | --- | --- | --- | --- | --- | --- | --- |
| S1 | ∞ | d0= | −0.687 |  |  |  |  |
| R1 | 2.461 | d1= | 0.960 | nd1 | 1.5444 | V1 | 55.82 |
| R2 | 9.803 | d2= | 0.149 |  |  |  |  |
| R3 | 7.154 | d3= | 0.320 | nd2 | 1.6700 | V2 | 19.39 |
| R4 | 3.909 | d4= | 0.502 |  |  |  |  |
| R5 | 14.239 | d5= | 0.582 | nd3 | 1.5444 | V3 | 55.82 |
| R6 | −720.601 | d6= | 0.389 |  |  |  |  |
| R7 | −38.629 | d7= | 0.572 | nd4 | 1.5661 | V4 | 37.71 |
| R8 | 21.022 | d8= | 0.404 |  |  |  |  |
| R9 | 4.204 | d9= | 0.775 | nd5 | 1.5444 | V5 | 55.82 |
| R10 | −9.238 | d10= | 0.587 |  |  |  |  |
| R11 | 14.353 | d11= | 0.718 | nd6 | 1.5346 | V6 | 55.69 |
| R12 | 1.977 | d12= | 0.630 |  |  |  |  |
| R13 | ∞ | d13= | 0.210 | ndg | 1.5168 | vg | 64.17 |
| R14 | ∞ | d14= | 0.394 |  |  |  |  |

In which, the meaning of the various symbols is as follows.

S1: Aperture;

R: The curvature radius of the optical surface, the central curvature radius in case of lens;

R1: The central curvature radius of the object side surface of the first lens L1;

R2: The central curvature radius of the image side surface of the first lens L1;

R3: The central curvature radius of the object side surface of the second lens L2;

R4: The central curvature radius of the image side surface of the second lens L2;

R5: The central curvature radius of the object side surface of the third lens L3;

R6: The central curvature radius of the image side surface of the third lens L3;

R7: The central curvature radius of the object side surface of the fourth lens L4;

R8: The central curvature radius of the image side surface of the fourth lens L4;

R9: The central curvature radius of the object side surface of the fifth lens L5;

R10: The central curvature radius of the image side surface of the fifth lens L5;

R11: The central curvature radius of the object side surface of the sixth lens L6;

R12: The central curvature radius of the image side surface of the sixth lens L6;

R13: The central curvature radius of the object side surface of the optical filter GF1;

R14: The center curvature radius of the image side surface of the optical filter GF1;

d: The thickness on-axis of the lens, and the distance on-axis between the lenses;

d0: The distance on-axis from the aperture Si to the object side surface of the first lens L1;

d1: The thickness on-axis of the first lens L1;

d2: The distance on-axis from the image side surface of the first lens L1 to the object side surface of the second lens L2;

d3: The thickness on-axis of the second lens L2;

d4: The distance on-axis from the image side surface of the second lens L2 and the object side surface of the third lens L3;

d5: The thickness on-axis of the third lens L3;

d6: The distance on-axis from the image side surface of the third lens L3 to the object side surface of the fourth lens L4;

d7: The thickness on-axis of f the fourth lens L4;

d8: The distance on-axis from the image side surface of the fourth lens L4 to the object side surface of the fifth lens L5;

d9: The thickness on-axis of the fifth lens L5;

d10: The distance on-axis from the image side surface of the fifth lens L5 to the object side surface of the sixth lens L6;

d11: The thickness on-axis of the sixth lens L6;

d12: The distance on-axis from the image side surface of the sixth lens L6 and the object side surface of the optical filter GF;

d13: The thickness on-axis of the optical filter GF;

d14: The distance on-axis from the image side surface of the optical filter GF1 and the object side surface of the optical filter GF2;

nd: The refractive power of d line (d line is green light with a wavelength of 550 nm);

nd1: The refractive power of the d line of the first lens L1;

nd2: The refractive power of the d line of the second lens L2;

nd3: The refractive power of the d line of the third lens L3;

nd4: The refractive power of the d line of the fourth lens L4;

nd5: The refractive power of the d line of the fifth lens L5;

nd6: The refractive power of the d line of the sixth lens L6;

ndg: The refractive power of d line of the optical filter GF;

vd: The abbe number;

V1: The abbe number of the first lens L1;

V2: The abbe number of the second lens L2;

V3: The abbe number of the third lens L3;

V4: The abbe number of the fourth lens L4;

V5: The abbe number of the fifth lens L5;

V6: The abbe number of the sixth lens L6;

vg: The abbe number of the optical filter GF.

Table 2 shows the aspheric data of each lens of the camera optical lens 10 in the first embodiment of the present disclosure.

TABLE 2

|  | conic coefficients | aspheric coefficients |  |  |  |  |
| --- | --- | --- | --- | --- | --- | --- |
|  | k | A4 | A6 | A8 | A10 | A12 |
| R1 | −9.32667E−01 | 7.56780E−03 | 4.12520E−03 | −5.32180E−03 | 6.20530E−03 | −4.73040E−03 |
| R2 | 1.78346E+01 | −2.63270E−02 | 1.47560E−02 | −4.12300E−03 | −2.61860E−03 | 4.03520E−03 |

TABLE 2-continued

| | | | | | |
|---|---|---|---|---|---|
| R3 | 1.20419E+01 | −5.32490E−02 | 3.19860E−02 | −1.14710E−02 | 3.25860E−03 | −2.12920E−03 |
| R4 | 3.70601E+00 | −3.64780E−02 | 1.19690E−02 | 3.80630E−02 | −1.03690E−01 | 1.44570E−01 |
| R5 | 2.30084E+01 | −3.16150E−02 | 4.27510E−02 | −2.06560E−01 | 6.35810E−01 | −1.37370E+00 |
| R6 | −2.98461E+01 | −2.36980E−02 | −9.39480E−02 | 4.84810E−01 | −1.50920E+00 | 3.10830E+00 |
| R7 | 9.14621E+01 | −6.06630E−02 | −9.34300E−03 | 6.16260E−02 | −8.26770E−02 | 3.94900E−02 |
| R8 | −9.87793E+01 | −6.42240E−02 | −4.79190E−02 | 1.32680E−01 | −1.82750E−01 | 1.68660E−01 |
| R9 | 3.64596E−02 | 1.39600E−02 | −4.81160E−02 | 5.12480E−02 | −4.13350E−02 | 2.38040E−02 |
| R10 | 3.67357E−01 | 5.08270E−02 | −2.30090E−02 | 1.27200E−02 | −8.98350E−03 | 4.86190E−03 |
| R11 | −4.37602E+00 | −9.56090E−02 | 2.51860E−02 | −2.11500E−03 | −1.77780E−03 | 1.21570E−03 |
| R12 | −2.40197E+00 | −1.00590E−01 | 4.52180E−02 | −1.62990E−02 | 4.52320E−03 | −9.48560E−04 |

| | conic coefficients | aspheric coefficients | | | | |
|---|---|---|---|---|---|---|
| | k | A14 | A16 | A18 | A20 | A22 |
| R1 | −9.32667E−01 | 2.37840E−03 | −7.56000E−04 | 1.37620E−04 | −1.11010E−05 | 0.00000E+00 |
| R2 | 1.78346E+01 | −2.56490E−03 | 9.13100E−04 | −1.76850E−04 | 1.44010E−05 | 0.00000E+00 |
| R3 | 1.20419E+01 | 1.48830E−03 | −5.23170E−04 | 7.57830E−05 | −1.56430E−06 | 0.00000E+00 |
| R4 | 3.70601E+00 | −1.22160E−01 | 6.19790E−02 | −1.73300E−02 | 2.06140E−03 | 0.00000E+00 |
| R5 | 2.30084E+01 | 2.09040E+00 | −2.26390E+00 | 1.74090E+00 | −9.30550E−01 | 3.26100E−01 |
| R6 | −2.98461E+01 | −4.47080E+00 | 4.60880E+00 | −3.44750E+00 | 1.87380E+00 | −7.32330E−01 |
| R7 | 9.14621E+01 | 3.35950E−02 | −7.16260E−02 | 5.93490E−02 | −2.95540E−02 | 9.57620E−03 |
| R8 | −9.87793E+01 | −1.07940E−01 | 4.86390E−02 | −1.55040E−02 | 3.48880E−03 | −5.48170E−04 |
| R9 | 3.64596E−02 | −9.77360E−03 | 2.88270E−03 | −6.14130E−04 | 9.43400E−05 | −1.03240E−05 |
| R10 | 3.67357E−01 | −1.80700E−03 | 4.66080E−04 | −8.49180E−05 | 1.10080E−05 | −1.00890E−06 |
| R11 | −4.37602E+00 | −4.06290E−04 | 8.53840E−05 | −1.21310E−05 | 1.19970E−06 | −8.30270E−08 |
| R12 | −2.40197E+00 | 1.49930E−04 | −1.78940E−05 | 1.60990E−06 | −1.08190E−07 | 5.32720E−09 |

| | conic coefficients | aspheric coefficients | | | |
|---|---|---|---|---|---|
| | k | A24 | A26 | A28 | A30 |
| R1 | −9.32667E−01 | 0.00000E+00 | 0.00000E+00 | 0.00000E+00 | 0.00000E+00 |
| R2 | 1.78346E+01 | 0.00000E+00 | 0.00000E+00 | 0.00000E+00 | 0.00000E+00 |
| R3 | 1.20419E+01 | 0.00000E+00 | 0.00000E+00 | 0.00000E+00 | 0.00000E+00 |
| R4 | 3.70601E+00 | 0.00000E+00 | 0.00000E+00 | 0.00000E+00 | 0.00000E+00 |
| R5 | 2.30084E+01 | −6.33850E−02 | 1.92110E−03 | 1.71990E−03 | −2.48510E−04 |
| R6 | −2.98461E+01 | 2.00440E−01 | −3.64530E−02 | 3.95580E−03 | −1.93750E−04 |
| R7 | 9.14621E+01 | −2.03890E−03 | 2.75940E−04 | −2.15750E−05 | 7.43150E−07 |
| R8 | −9.87793E+01 | 5.86030E−05 | −4.04370E−06 | 1.61410E−07 | −2.80510E−09 |
| R9 | 3.64596E−02 | 7.83450E−07 | −3.91140E−08 | 1.15430E−09 | −1.52440E−11 |
| R10 | 3.67357E−01 | 6.38570E−08 | −2.65310E−09 | 6.50600E−11 | −7.13050E−13 |
| R11 | −4.37602E+00 | 3.95390E−09 | −1.23680E−10 | 2.29130E−12 | −1.9068E−14 |
| R12 | −2.40197E+00 | −1.85880E−10 | 4.33660E−12 | −6.04820E−14 | 3.80260E−16 |

For convenience, the aspheric of each lens is used the aspherical surfaces shown in formula (1) below. However, the present disclosure is not limited to the aspheric polynomial form represented by the formula (1).

$$z = (cr^2)/\left\{1 + [1 - (k + 1)(c^2 r^2)]^{1/2}\right\} + A4r^4 + A6r^6 + \\ A8r^8 + A10r^{10} + A12r^{12} + A14r^{14} + A16r^{16} + A18r^{18} + \\ A20r^{20} + A22r^{22} + A24r^{24} + A26r^{26} + A28r^{28} + A30r^{30} \tag{1}$$

Where k is the cone coefficient, A4, A6, A8, A10, A12, A14, A16, A18, A20, A22, A24, A26, A28, and A30 are aspheric coefficients, c is the curvature at the center of the optical surface, r is the vertical distance between the point on the aspheric curve and the optical axis, and z is the aspherical depth (i.e., the vertical distance between a point on the aspherical surface r from the optical axis and a section tangent to the vertex on the aspherical optical axis).

Table 3 and Table 4 respectively show the design data of the inflection point and stationary point of each lens of the camera optical lens 10 in the first embodiment of the present disclosure. Where P1R1 and P1R2 respectively represent the object side surface and the image side surface of the first lens L1, P2R1 and P2R2 respectively represent the object side surface and the image side surface of the second lens L2, P3R1 and P3R2 respectively represent the object side surface and the image side surface of the third lens L3, P4R1 and P4R2 respectively represent the object side surface and the image side surface of the fourth lens L4, P5R1 and P5R2 respectively represent the object side surface and the image side surface of the fifth lens L5, and P6R1 and P6R2 respectively represent the object side surface and the image side surface of the sixth lens L6. The data corresponding to the field of "location of inflection point" is the vertical distance between the inflection point set on the surface of each lens and the optical axis of the camera optical lens 10. The data corresponding to the field of "location of stationary point" is the vertical distance from the stationary point set on the surface of each lens to the optical axis of the camera optical lens 10.

TABLE 3

| | The number of inflection points | the location 1 of inflection point | the location 2 of inflection point | the location 3 of inflection point |
|---|---|---|---|---|
| P1R1 | 1 | 1.695 | | |
| P1R2 | 1 | 1.285 | | |
| P3R1 | 2 | 0.475 | 1.405 | |

TABLE 3-continued

| | The number of inflection points | the location 1 of inflection point | the location 2 of inflection point | the location 3 of inflection point |
|---|---|---|---|---|
| P3R2 | 1 | 1.585 | | |
| P4R1 | 2 | 1.425 | 1.885 | |
| P4R2 | 3 | 0.245 | 1.525 | 2.225 |
| P5R1 | 2 | 1.055 | 2.475 | |
| P5R2 | 3 | 0.475 | 1.405 | 2.975 |
| P6R1 | 3 | 0.255 | 1.845 | 3.905 |
| P6R2 | 3 | 0.765 | 3.855 | 4.305 |

TABLE 4

| | the number of stationary points | the location 1 of stationary point | the location 2 of stationary point |
|---|---|---|---|
| P1R2 | 1 | 1.625 | |
| P3R1 | 1 | 0.785 | |
| P4R2 | 1 | 0.405 | |
| P5R1 | 1 | 1.715 | |
| P5R2 | 2 | 0.935 | 1.765 |
| P6R1 | 2 | 0.445 | 3.545 |
| P6R2 | 1 | 1.855 | |

Figure 2:
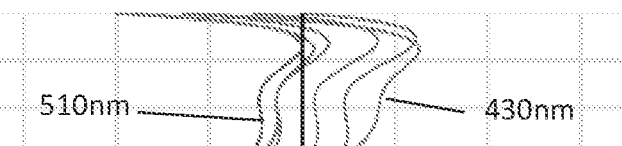
FIG. 2 shows the longitudinal aberration of the camera optical lens shown in FIG. 1.
Figure 2:
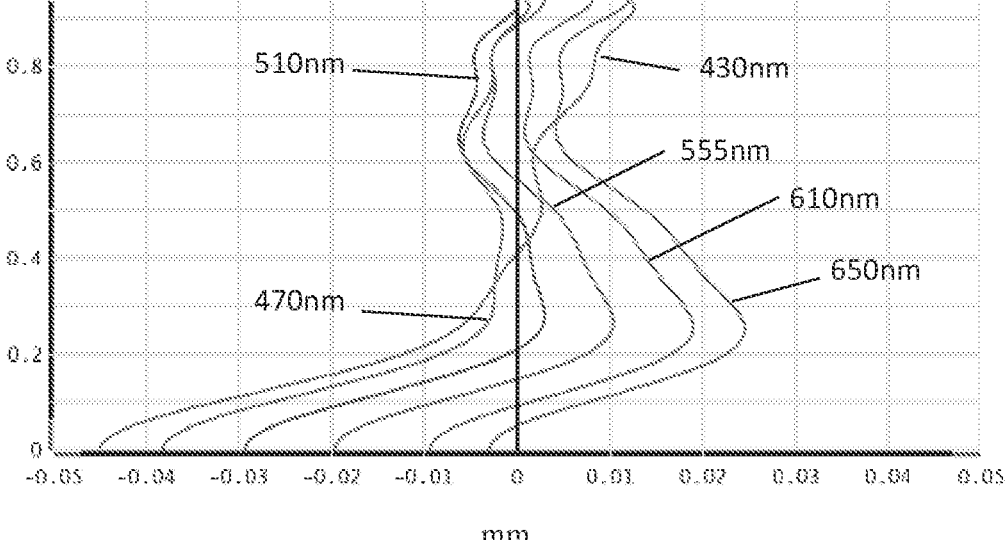
Figure 3:
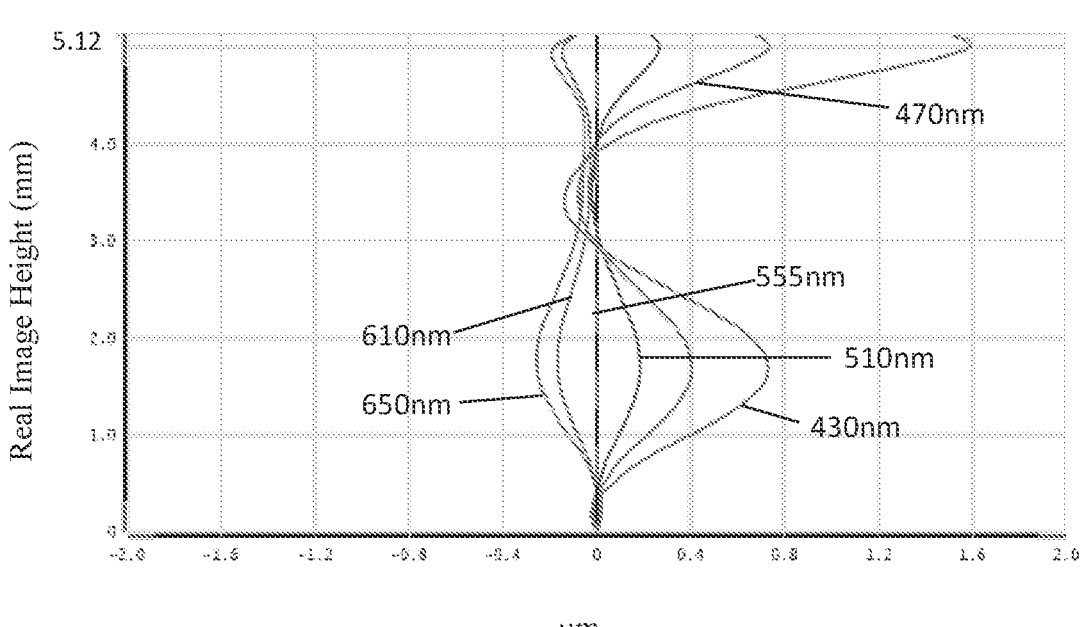
FIG. 3 shows the lateral color of the camera optical lens shown in FIG. 1.
Figure 4:
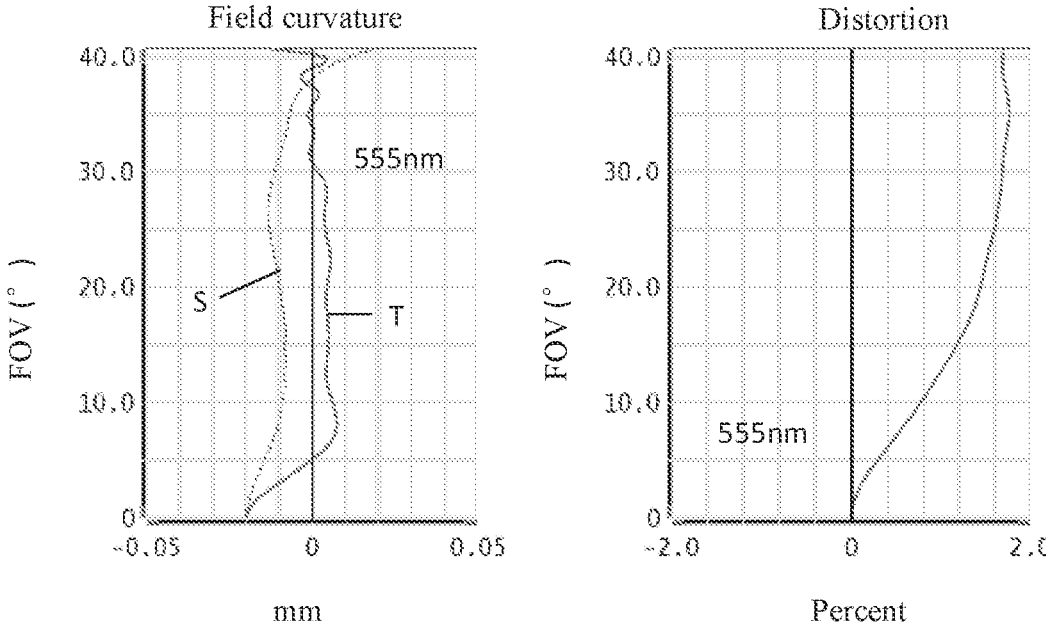
FIG. 4 presents a schematic diagram of the field curvature and distortion of the camera optical lens shown in FIG. 1.

FIG. 2 and FIG. 3 respectively show the longitudinal aberration and lateral color schematic diagrams after light with wavelengths of 650 nm, 610 nm, 555 nm, 510 nm, 470 nm and 430 nm passes through the camera optical lens 10 in the first implementation. FIG. 4 shows the schematic diagrams of the field curvature and distortion after light with a wavelength of 555 nm passes through the camera optical lens 10 in the first embodiment. The field curvature S in FIG. 4 is a field curvature in the sagittal direction, and T is the field curvature in the meridian direction.

Table 25, which appears later, shows the various values in each embodiment, and the values corresponding with the parameters which are already fixed in the conditions.

As shown in Table 25, the first embodiment satisfies the various conditions.

In this embodiment, the pupil entering diameter (ENPD) of the camera optical lens 10 is 3.442 mm, the full vision field image height (IH) is 5.120 mm, and the vision field angle (FOV) in the diagonal direction is 81.30°. The camera optical lens 10 can meet the design requirements of large aperture, wide-angle and ultra-thin, and chromatic aberrations on-axis and chromatic aberrations off-axis are adequately corrected. And the camera optical lens 10 has excellent optical characteristics.

Embodiment 2

Embodiment 2 may also be described in the following description as a second embodiment. The second embodiment is basically the same as the first embodiment, the meaning of its symbols is the same as that of the first embodiment, in the following, only the differences are described.

Figure 5:
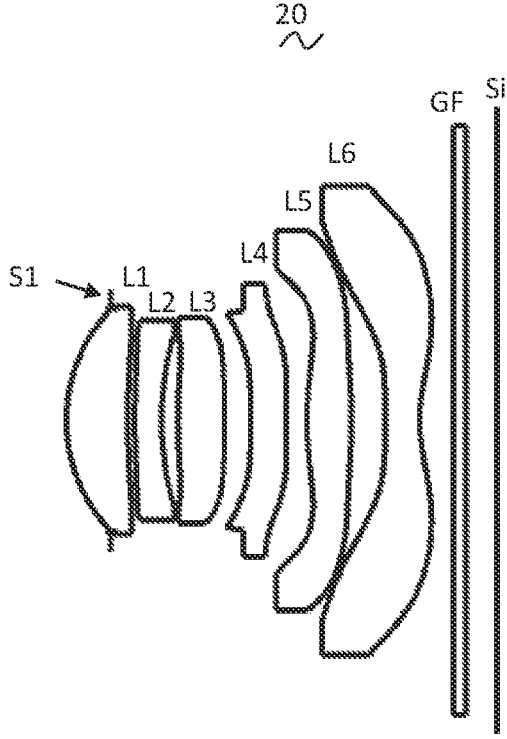
FIG. 5 is a schematic diagram of t a camera optical lens in accordance with a second embodiment of the present disclosure.

FIG. 5 shows the camera optical lens 20 in the second embodiment of the present disclosure.

Tables 5 shows the design data of the camera optical lens 20 in the second embodiment of the present disclosure.

TABLE 5

| | R | | d | nd | | vd | |
|---|---|---|---|---|---|---|---|
| S1 | ∞ | d0= | −0.767 | | | | |
| R1 | 2.524 | d1= | 1.051 | nd1 | 1.5444 | V1 | 55.82 |
| R2 | 9.056 | d2= | 0.119 | | | | |
| R3 | 8.597 | d3= | 0.462 | nd2 | 1.6700 | V2 | 19.39 |
| R4 | 3.982 | d4= | 0.286 | | | | |
| R5 | 7.196 | d5= | 0.799 | nd3 | 1.5444 | V3 | 55.82 |
| R6 | −158.825 | d6= | 0.456 | | | | |
| R7 | −24.834 | d7= | 0.615 | nd4 | 1.5661 | V4 | 37.71 |
| R8 | 13.872 | d8= | 0.353 | | | | |
| R9 | 5.466 | d9= | 0.767 | nd5 | 1.5444 | V5 | 55.82 |
| R10 | −6.123 | d10= | 0.571 | | | | |
| R11 | 30.643 | d11= | 0.598 | nd6 | 1.5346 | V6 | 55.69 |
| R12 | 2.144 | d12= | 0.595 | | | | |
| R13 | ∞ | d13= | 0.210 | ndg | 1.5168 | vg | 64.17 |
| R14 | ∞ | d14= | 0.529 | | | | |

Table 6 shows the aspheric data of each lens of the camera optical lens 20 in the second embodiment of the present disclosure.

TABLE 6

| | conic coefficients | aspheric coefficients | | | | |
|---|---|---|---|---|---|---|
| | k | A4 | A6 | A8 | A10 | A12 |
| R1 | −9.45838E−01 | 6.62810E−03 | 3.89430E−03 | −5.38350E−03 | 6.19910E−03 | −4.72930E−03 |
| R2 | 1.24489E+01 | −2.83380E−02 | 1.51140E−02 | −4.03170E−03 | −2.64810E−03 | 4.01630E−03 |
| R3 | 1.29257E+01 | −5.04240E−02 | 3.10160E−02 | −1.13420E−02 | 3.28700E−03 | −2.13500E−03 |
| R4 | 3.11560E+00 | −4.01800E−02 | 1.21600E−02 | 3.79310E−02 | −1.03930E−01 | 1.44660E−01 |
| R5 | 2.16696E+01 | −3.86540E−02 | 4.28740E−02 | −2.06080E−01 | 6.35740E−01 | −1.37370E+00 |
| R6 | 1.76639E+03 | −1.99680E−02 | −9.26890E−02 | 4.85070E−01 | −1.50920E+00 | 3.10820E+00 |
| R7 | 1.96458E+02 | −6.04120E−02 | −9.32490E−02 | 6.16900E−02 | −8.27190E−02 | 3.94650E−02 |
| R8 | −2.28390E+01 | −6.41550E−02 | −4.81440E−02 | 1.32530E−01 | −1.82750E−01 | 1.68660E−01 |
| R9 | −4.26928E+00 | 1.34300E−02 | −4.88690E−02 | 5.11960E−02 | −4.13320E−02 | 2.38050E−02 |
| R10 | 6.55791E−01 | 5.01640E−02 | −2.28390E−02 | 1.27350E−02 | −8.98290E−03 | 4.86190E−03 |
| R11 | −2.00724E+01 | −9.57190E−02 | 2.51240E−02 | −2.11380E−03 | −1.77770E−03 | 1.21580E−03 |
| R12 | −2.83290E+00 | −9.97000E−02 | 4.50550E−02 | −1.63000E−02 | 4.52320E−03 | −9.48560E−04 |

| | conic coefficients | aspheric coefficients | | | | |
|---|---|---|---|---|---|---|
| | k | A14 | A16 | A18 | A20 | A22 |
| R1 | −9.45838E−01 | 2.37670E−03 | −7.55570E−04 | 1.37740E−04 | −1.11000E−05 | 4.32920E−09 |
| R2 | 1.24489E+01 | −2.56830E−03 | 9.13160E−04 | −1.76700E−04 | 1.46370E−05 | 9.17330E−08 |

TABLE 6-continued

| | | | | | |
|---|---|---|---|---|---|
| R3 | 1.29257E+01 | 1.48640E−03 | −5.22100E−04 | 7.55630E−05 | −1.53720E−06 | 1.23260E−08 |
| R4 | 3.11560E+00 | −1.22140E−01 | 6.19830E−02 | −1.73380E−02 | 2.06130E−03 | 1.68710E−06 |
| R5 | 2.16696E+01 | 2.09040E+00 | −2.26390E+00 | 1.74090E+00 | −9.30550E−01 | 3.26100E−01 |
| R6 | 1.76639E+03 | −4.47090E+00 | 4.60880E+00 | −3.44750E+00 | 1.87380E+00 | −7.32330E−01 |
| R7 | 1.96458E+02 | 3.35880E−02 | −7.16270E−02 | 5.93490E−02 | −2.95540E−02 | 9.57620E−03 |
| R8 | −2.28390E+01 | −1.07940E−01 | 4.86390E−02 | −1.55040E−02 | 3.48880E−03 | −5.48170E−04 |
| R9 | −4.26928E+00 | −9.77360E−03 | 2.88270E−03 | −6.14130E−04 | 9.43400E−05 | −1.03240E−05 |
| R10 | 6.55791E−01 | −1.80700E−03 | 4.66080E−04 | −8.49180E−05 | 1.10080E−05 | −1.00890E−06 |
| R11 | −2.00724E+01 | −4.06290E−04 | 8.53840E−05 | −1.21310E−05 | 1.19970E−06 | −8.30270E−08 |
| R12 | −2.83290E+00 | 1.49930E−04 | −1.78940E−05 | 1.60990E−06 | −1.08190E−07 | 5.32720E−09 |

| | conic coefficients | aspheric coefficients | | | |
|---|---|---|---|---|---|
| | k | A24 | A26 | A28 | A30 |
| R1 | −9.45838E−01 | −8.07020E−09 | −1.44430E−09 | 1.97830E−10 | 3.75620E−10 |
| R2 | 1.24489E+01 | 2.02900E−08 | −1.25260E−09 | −1.81670E−09 | −5.65560E−10 |
| R3 | 1.29257E+01 | 9.13590E−08 | −2.51620E−09 | −7.08640E−09 | −1.58590E−09 |
| R4 | 3.11560E+00 | 1.36750E−06 | −1.09770E−06 | −1.12170E−07 | 1.14740E−07 |
| R5 | 2.16696E+01 | −6.33850E−02 | 1.92090E−03 | 1.72010E−03 | −2.48460E−04 |
| R6 | 1.76639E+03 | 2.00440E−01 | −3.64530E−03 | 3.95580E−03 | −1.93750E−04 |
| R7 | 1.96458E+02 | −2.03890E−03 | 2.75940E−04 | −2.15750E−05 | 7.43220E−07 |
| R8 | −2.28390E+01 | 5.86030E−05 | −4.04370E−06 | 1.61400E−07 | −2.80520E−09 |
| R9 | −4.26928E+00 | 7.83460E−07 | −3.91120E−08 | 1.15380E−09 | −1.52350E−11 |
| R10 | 6.55791E−01 | 6.38570E−08 | −2.65310E−10 | 6.50600E−11 | −7.13070E−13 |
| R11 | −2.00724E+01 | 3.95390E−09 | −1.23690E−10 | 2.29140E−12 | −1.9071E−14 |
| R12 | −2.83290E+00 | −1.85880E−10 | 4.33660E−12 | −6.04800E−14 | 3.80500E−16 |

Table 7 and Table 8 respectively show the design data of the inflection point and stationary point of each lens of the camera optical lens 20 in the second embodiment of the present disclosure.

TABLE 7

| | The number of inflection points | the location 1 of inflection point | the location 2 of inflection point | the location 3 of inflection point |
|---|---|---|---|---|
| P1R1 | 1 | 1.735 | | |
| P1R2 | 1 | 1.195 | | |
| P2R1 | 2 | 0.675 | 0.785 | |
| P3R1 | 2 | 0.665 | 1.365 | |
| P4R1 | 1 | 1.765 | | |
| P4R2 | 3 | 0.295 | 1.545 | 2.125 |
| P5R1 | 2 | 0.865 | 2.335 | |
| P5R2 | 2 | 0.655 | 1.245 | |
| P6R1 | 2 | 0.175 | 1.895 | |
| P6R2 | 2 | 0.715 | 3.585 | |

TABLE 8

| | the number of stationary points | the location 1 of stationary point |
|---|---|---|
| P1R2 | 1 | 1.665 |
| P3R1 | 1 | 1.075 |
| P4R2 | 1 | 0.495 |
| P5R1 | 1 | 1.385 |
| P6R1 | 1 | 0.295 |
| P6R2 | 1 | 1.655 |

Figure 6:
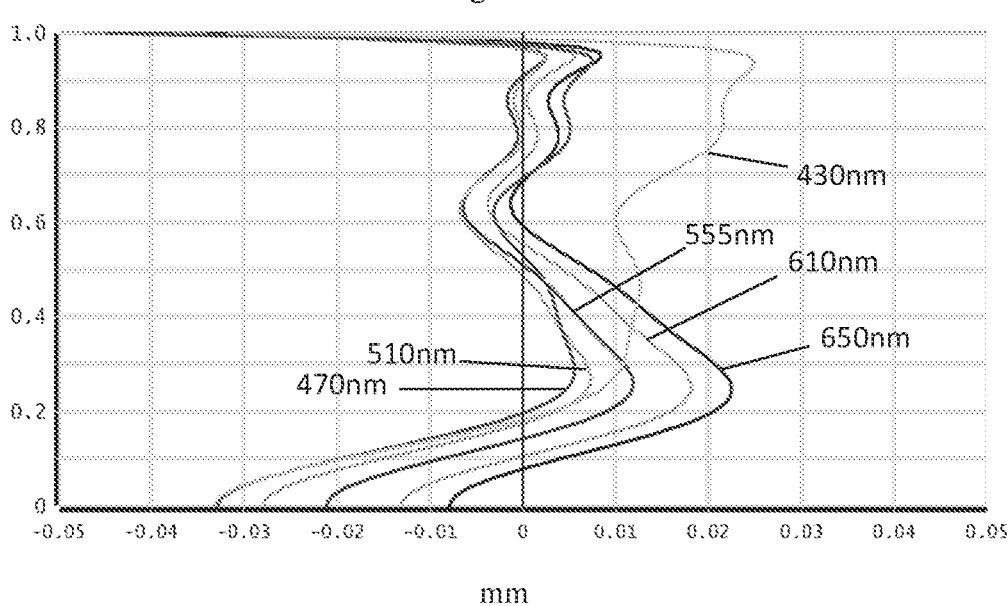
FIG. 6 shows the longitudinal aberration of the camera optical lens shown in FIG. 5.
Figure 7:
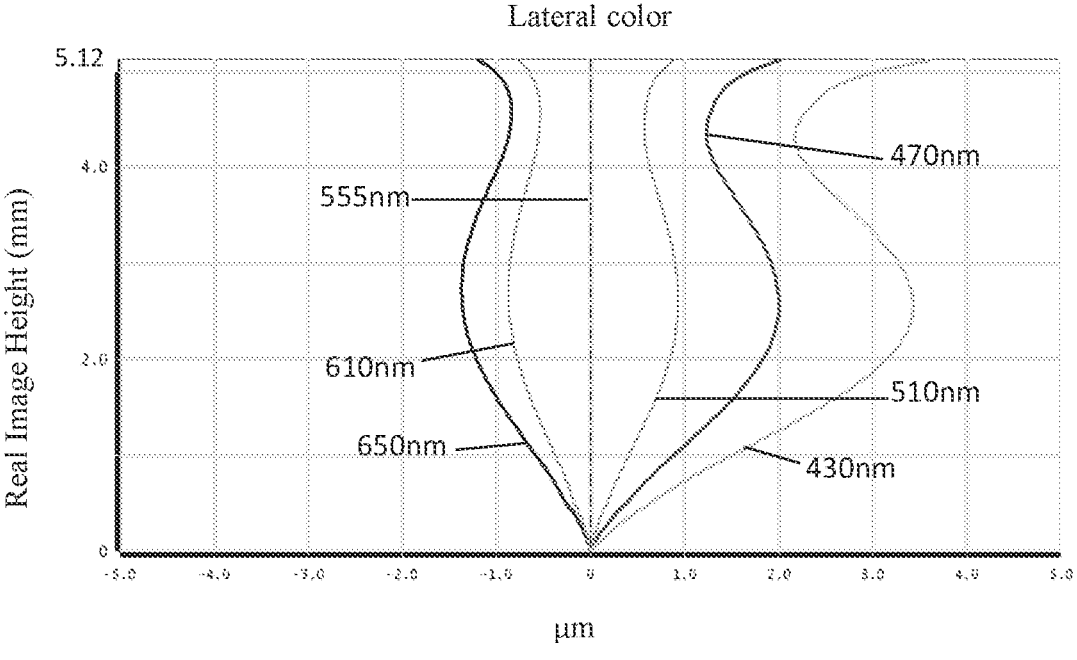
FIG. 7 shows the lateral color of the camera optical lens shown in in FIG. 5.
Figure 8:
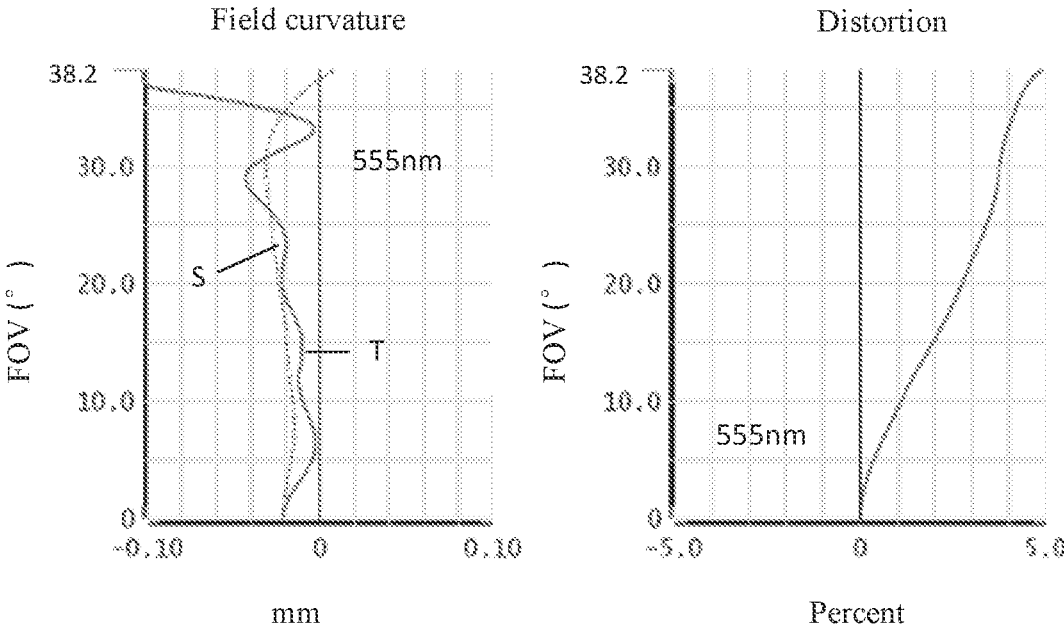
FIG. 8 presents a schematic diagram of the field curvature and distortion of the camera optical lens shown in FIG. 5.

FIG. 6 and FIG. 7 respectively show the longitudinal aberration and lateral color schematic diagrams after light with wavelengths of 650 nm, 610 nm, 555 nm, 510 nm, 470 nm and 430 nm passes through the camera optical lens 20 in the second embodiment. FIG. 8 shows the schematic diagrams of the field curvature and distortion after light with a wavelength of 555 nm passes through the camera optical lens 20 in the second implementation. The field curvature S in FIG. 8 is a field curvature in the sagittal direction, and T is the field curvature in the meridian direction.

As shown in Table 25, the second embodiment satisfies the various conditions.

In this embodiment, the pupil entering diameter (ENPD) of the camera optical lens 20 is 3.635 mm, the full vision field image height (IH) is 5.120 mm, and the vision field angle (FOV) in the diagonal direction is 76.44°. The camera optical lens 20 can meet the design requirements of large aperture, wide-angle and ultra-thin, and chromatic aberrations on-axis and chromatic aberrations off-axis are adequately corrected. And the camera optical lens 20 has excellent optical characteristics.

Embodiment 3

Embodiment 3 may also be described in the following description as a third embodiment. The third embodiment is basically the same as the first embodiment, and the meaning of its symbols is the same as the first embodiment, in the following, only the differences are described.

Figure 9:
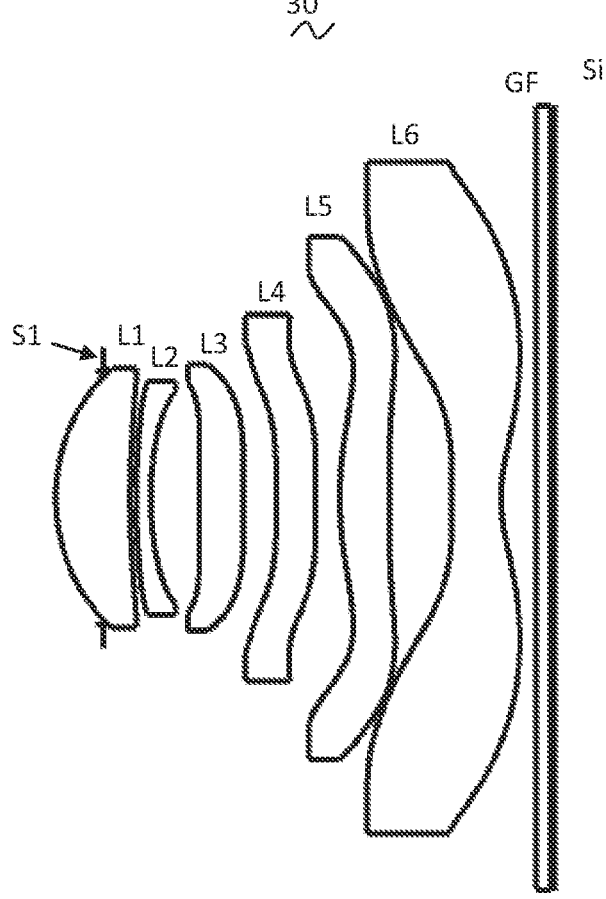
FIG. 9 is a schematic diagram of a camera optical lens in accordance with a third embodiment of the present disclosure.

FIG. 9 shows the camera optical lens 30 in the third embodiment of the present disclosure.

Table 9 shows the design data of the camera optical lens 30 in the third embodiment of the present disclosure.

TABLE 9

| | R | d | | nd | | νd | |
|---|---|---|---|---|---|---|---|
| S1 | ∞ | d0= | −0.655 | | | | |
| R1 | 2.309 | d1= | 1.027 | nd1 | 1.5444 | V1 | 55.82 |
| R2 | 9.181 | d2= | 0.080 | | | | |
| R3 | 6.540 | d3= | 0.207 | nd2 | 1.6700 | V2 | 19.39 |
| R4 | 3.799 | d4= | 0.662 | | | | |
| R5 | 16.351 | d5= | 0.622 | nd3 | 1.5444 | V3 | 55.82 |
| R6 | −122.258 | d6= | 0.448 | | | | |
| R7 | −148.619 | d7= | 0.548 | nd4 | 1.5661 | V4 | 37.71 |
| R8 | 29.783 | d8= | 0.335 | | | | |

TABLE 9-continued

| | R | | d | | nd | | νd |
|---|---|---|---|---|---|---|---|
| R9 | 4.790 | d9= | 0.691 | nd5 | 1.5444 | V5 | 55.82 |
| R10 | −23.555 | d10= | 0.857 | | | | |
| R11 | 1415.840 | d11= | 0.679 | nd6 | 1.5346 | V6 | 55.69 |
| R12 | 2.000 | d12= | 0.483 | | | | |

TABLE 9-continued

| | R | d | | nd | | νd |
|---|---|---|---|---|---|---|
| R13 | ∞ | d13= | 0.210 | ndg | 1.5168 νg | 64.17 |
| R14 | ∞ | d14= | 0.046 | | | |

Table 10 shows the aspheric data of each lens of the camera optical lens 30 in the third embodiment of the present disclosure.

TABLE 10

| | conic coefficients | aspheric coefficients | | | | |
|---|---|---|---|---|---|---|
| | k | A4 | A6 | A8 | A10 | A12 |
| R1 | −8.55464E−01 | 9.83990E−03 | 4.58930E−03 | −5.28810E−03 | 6.22190E−03 | −4.72740E−03 |
| R2 | 1.86527E+01 | −2.66550E−02 | 1.45200E−02 | −4.13590E−03 | −2.67720E−03 | 4.04540E−03 |
| R3 | 1.23840E+01 | −5.29680E−02 | 3.32880E−02 | −1.14420E−02 | 3.22660E−03 | −2.14400E−03 |
| R4 | 4.33206E+00 | −2.91850E−02 | 1.23720E−02 | 3.87860E−02 | −1.03490E−01 | 1.44600E−01 |
| R5 | 1.94012E+00 | −3.07930E−02 | 4.31870E−02 | −2.06530E−01 | 6.35840E−01 | −1.37370E+00 |
| R6 | 4.21994E+03 | −3.08620E−02 | −9.21960E−02 | 4.84880E−01 | −1.50940E+00 | 3.10830E+00 |
| R7 | 4.84271E+03 | −6.70350E−02 | −9.41910E−03 | 6.16700E−02 | −8.26620E−02 | 3.94880E−02 |
| R8 | −1.22956E+01 | −6.30930E−02 | −4.82040E−02 | 1.32670E−01 | −1.82740E−01 | 1.68660E−01 |
| R9 | 3.20750E−01 | 1.54870E−02 | −4.81130E−02 | 5.12370E−02 | −4.13360E−02 | 2.38040E−02 |
| R10 | 1.85350E+01 | 4.66720E−02 | −2.29040E−02 | 1.27280E−02 | −8.98330E−03 | 4.86190E−03 |
| R11 | −1.38050E+03 | −9.49560E−02 | 2.51810E−02 | −2.11480E−03 | −1.77780E−03 | 1.21570E−03 |
| R12 | −2.49314E+00 | −9.98970E−02 | 4.52270E−02 | −1.63000E−02 | 4.52310E−03 | −9.48560E−04 |

| | conic coefficients | aspheric coefficients | | | | |
|---|---|---|---|---|---|---|
| | k | A14 | A16 | A18 | A20 | A22 |
| R1 | −8.55464E−01 | 2.37750E−03 | −7.56910E−04 | 1.37710E−04 | −1.11090E−05 | −3.52820E−09 |
| R2 | 1.86527E+01 | −2.55820E−03 | 9.13980E−04 | −1.76360E−04 | 1.43240E−05 | −2.18420E−08 |
| R3 | 1.23840E+01 | 1.48840E−03 | −5.20280E−04 | 7.63140E−05 | −5.50710E−07 | 4.86350E−07 |
| R4 | 4.33206E+00 | −1.22170E−01 | 6.19840E−02 | −1.73340E−02 | 2.06190E−03 | 3.25440E−07 |
| R5 | 1.94012E+00 | 2.09040E+00 | −2.26380E+00 | 1.74090E+00 | −9.30550E−01 | 3.26100E−01 |
| R6 | 4.21994E+03 | −4.47080E+00 | 4.60880E+00 | −3.44750E+00 | 1.87380E+00 | −7.32330E−01 |
| R7 | 4.84271E+03 | 3.35950E−02 | −7.16260E−02 | 5.93490E−02 | −2.95540E−02 | 9.57620E−03 |
| R8 | −1.22956E+01 | −1.07940E−01 | 4.86390E−02 | −1.55040E−02 | 3.48880E−03 | −5.48170E−04 |
| R9 | 3.20750E−01 | −9.77360E−03 | 2.88270E−03 | −6.14130E−04 | 9.43400E−05 | −1.03240E−05 |
| R10 | 1.85350E+01 | −1.80700E−03 | 4.66080E−04 | −8.49180E−05 | 1.10080E−05 | −1.00890E−06 |
| R11 | −1.38050E+03 | −4.06290E−04 | 8.53840E−05 | −1.21310E−05 | 1.19970E−06 | −8.30270E−08 |
| R12 | −2.49314E+00 | 1.49930E−04 | −1.78940E−05 | 1.60990E−06 | −1.08190E−07 | 5.32720E−09 |

| | conic coefficients | aspheric coefficients | | | |
|---|---|---|---|---|---|
| | k | A24 | A26 | A28 | A30 |
| R1 | −8.55464E−01 | 5.64950E−09 | −9.94910E−10 | 1.62560E−10 | −2.13880E−10 |
| R2 | 1.86527E+01 | −2.43980E−08 | −3.17870E−09 | −4.63160E−10 | −2.45460E−09 |
| R3 | 1.23840E+01 | 2.79510E−09 | 2.75210E−09 | −1.73930E−08 | −2.48320E−08 |
| R4 | 4.33206E+00 | 1.99870E−06 | 8.28460E−07 | −2.07760E−07 | −2.16130E−07 |
| R5 | 1.94012E+00 | −6.33860E−02 | 1.92120E−03 | 1.71980E−03 | −2.48470E−04 |
| R6 | 4.21994E+03 | 2.00440E−01 | −3.64530E−02 | 3.95580E−03 | −1.93750E−04 |
| R7 | 4.84271E+03 | −2.03890E−03 | 2.75940E−04 | −2.15750E−05 | 7.43140E−07 |
| R8 | −1.22956E+01 | 5.86030E−05 | −4.04370E−06 | 1.61410E−07 | −2.80510E−09 |
| R9 | 3.20750E−01 | 7.83450E−07 | −3.91140E−08 | 1.15430E−09 | −1.52440E−11 |
| R10 | 1.85350E+01 | 6.38570E−08 | −2.65310E−09 | 6.50600E−11 | −7.13050E−13 |
| R11 | −1.38050E+03 | 3.95390E−09 | −1.23680E−10 | 2.29130E−12 | −1.9068E−14 |
| R12 | −2.49314E+00 | −1.85880E−10 | 4.33660E−12 | −6.04820E−14 | 3.80260E−16 |

Table 11 and Table 12 respectively show the design data of the inflection point and stationary point of each lens of the camera optical lens 30 in the third embodiment of the present disclosure.

TABLE 11

| | The number of inflection points | the location 1 of inflection point | the location 2 of inflection point | the location 3 of inflection point |
|---|---|---|---|---|
| P1R1 | 1 | 1.685 | | |
| P1R2 | 1 | 1.335 | | |
| P3R1 | 3 | 0.445 | 1.455 | 1.475 |
| P4R1 | 2 | 1.455 | 1.895 | |
| P4R2 | 3 | 0.205 | 1.525 | 2.355 |
| P5R1 | 2 | 1.035 | 2.505 | |
| P5R2 | 2 | 0.295 | 1.375 | |
| P6R1 | 3 | 0.025 | 1.875 | 3.755 |
| P6R2 | 2 | 0.755 | 4.065 | |

TABLE 12

| | the number of stationary points | the location 1 of stationary point | the location 2 of stationary point |
|---|---|---|---|
| P1R2 | 1 | 1.585 | |
| P3R1 | 1 | 0.745 | |
| P4R2 | 2 | 0.345 | 2.125 |
| P5R1 | 1 | 1.665 | |
| P5R2 | 2 | 0.525 | 1.885 |
| P6R1 | 1 | 0.045 | |
| P6R2 | 1 | 1.875 | |

Figure 10:
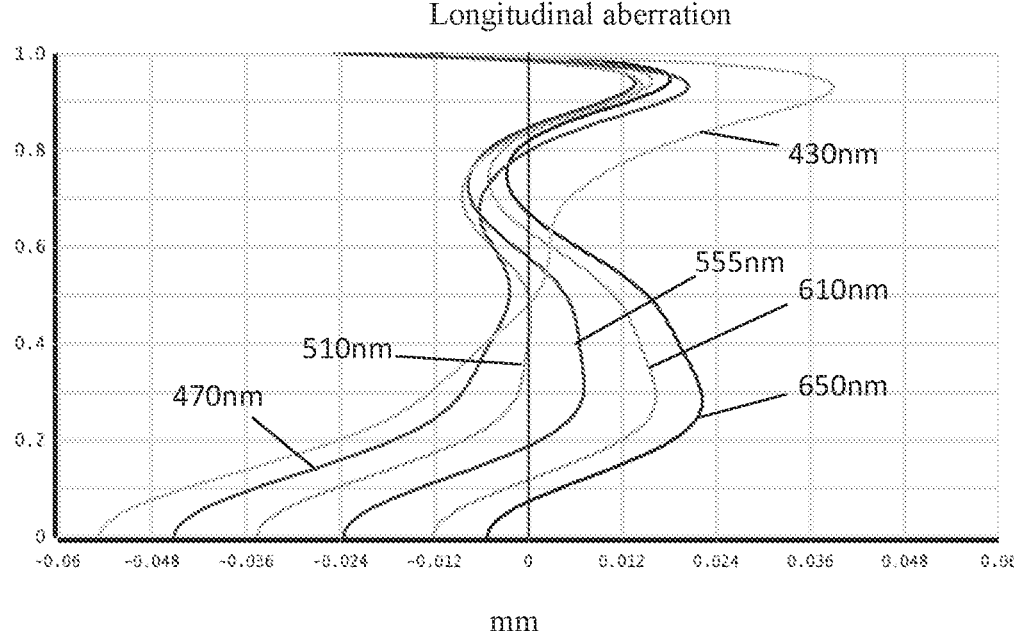
FIG. 10 shows the longitudinal aberration of the camera optical lens shown in FIG. 9.
Figure 11:
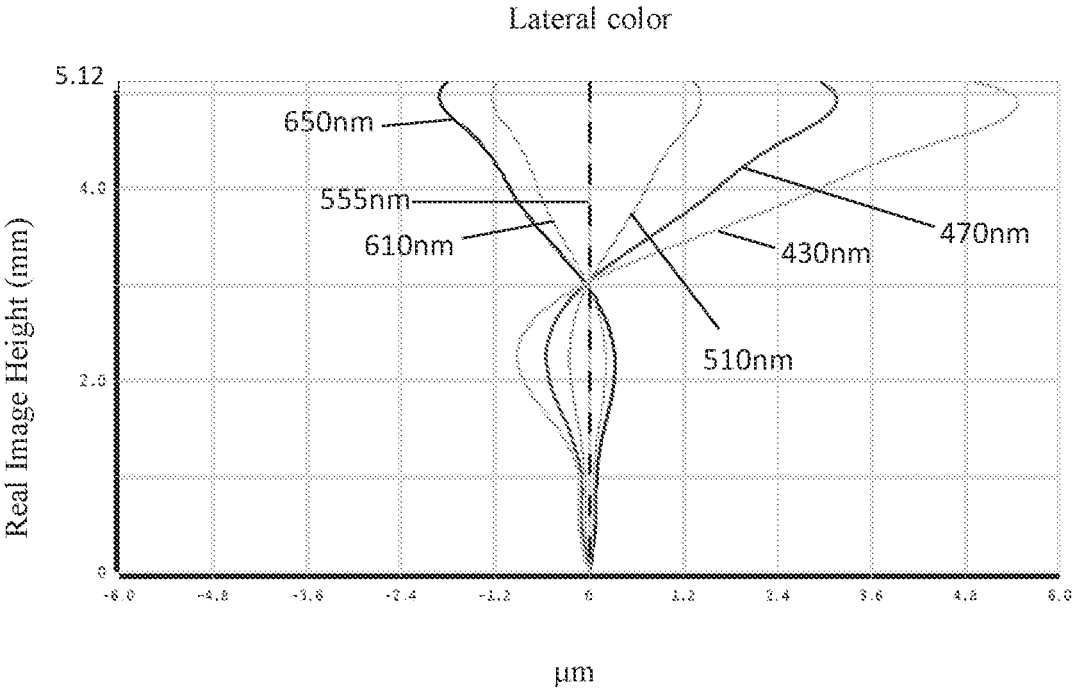
FIG. 11 shows the lateral color of the camera optical lens shown in in FIG. 9.
Figure 12:
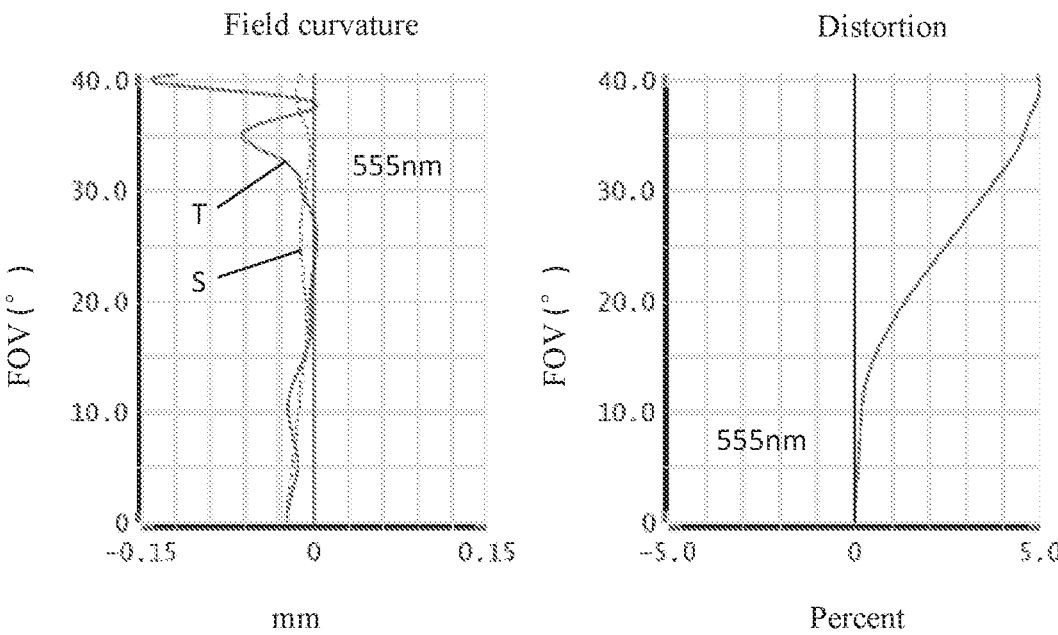
FIG. 12 presents a schematic diagram of the field curvature and distortion of the camera optical lens shown in FIG. 9.

FIG. 10 and FIG. 11 respectively show the longitudinal aberration and lateral color schematic diagrams after light with wavelengths of 650 nm, 610 nm, 555 nm, 510 nm, 470 nm and 430 nm passes through the camera optical lens 30 in the third embodiment. FIG. 12 shows the schematic diagrams of the field curvature and distortion after light with a wavelength of 555 nm passes through the camera optical lens 30 in the third embodiment. The field curvature S in FIG. 12 is a field curvature in the sagittal direction, and T is the field curvature in the meridian direction.

As shown in Table 25, the third embodiment satisfies the various conditions.

In this embodiment, the pupil entering diameter (ENPD) of the camera optical lens 30 is 3.330 mm, the full vision field image height (IH) is 5.120 mm, and the vision field angle (FOV) in the diagonal direction is 80.00°. The camera optical lens 30 can meet the design requirements of large aperture, wide-angle and ultra-thin, and chromatic aberrations on-axis and chromatic aberrations off-axis are adequately corrected. And the camera optical lens 30 has excellent optical characteristics.

Embodiment 4

Embodiment 4 may also be described in the following description as a fourth embodiment. The fourth embodiment is basically the same as the first embodiment, and the meaning of its symbols is the same as the first embodiment, in the following, only the differences are described.

Figure 13:
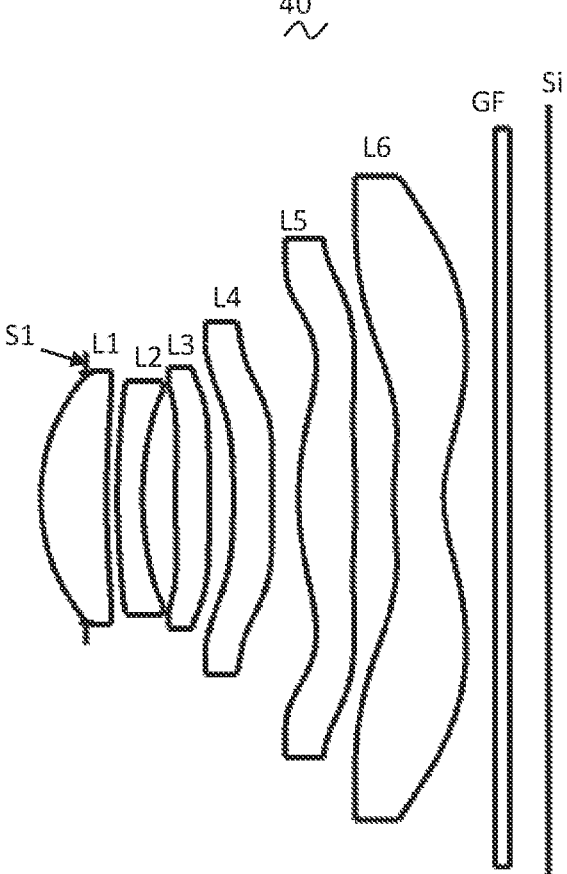
FIG. 13 is a schematic diagram of a camera optical lens in accordance with a fourth embodiment of the present disclosure.

FIG. 13 shows the camera optical lens 40 in the fourth embodiment of the present disclosure.

Table 13 shows the design data of the camera optical lens 40 in the fourth embodiment of the present disclosure.

TABLE 13

| | R | | d | nd | | vd | |
|---|---|---|---|---|---|---|---|
| S1 | ∞ | d0= | −0.624 | | | | |
| R1 | 2.408 | d1= | 0.904 | nd1 | 1.5444 | V1 | 55.82 |
| R2 | 10.037 | d2= | 0.146 | | | | |
| R3 | 6.930 | d3= | 0.348 | nd2 | 1.6700 | V2 | 19.39 |
| R4 | 3.773 | d4= | 0.451 | | | | |
| R5 | 15.375 | d5= | 0.458 | nd3 | 1.5444 | V3 | 55.82 |
| R6 | 110.264 | d6= | 0.336 | | | | |
| R7 | −15.788 | d7= | 0.537 | nd4 | 1.5661 | V4 | 37.71 |
| R8 | 15.615 | d8= | 0.360 | | | | |
| R9 | 3.739 | d9= | 0.776 | nd5 | 1.5444 | V5 | 55.82 |
| R10 | −8.174 | d10= | 0.539 | | | | |
| R11 | 4.370 | d11= | 0.678 | nd6 | 1.5346 | V6 | 55.69 |
| R12 | 1.766 | d12= | 0.706 | | | | |
| R13 | ∞ | d13= | 0.210 | ndg | 1.5168 | vg | 64.17 |
| R14 | ∞ | d14= | 0.524 | | | | |

Table 14 shows the aspheric data of each lens of the camera optical lens 40 in the fourth embodiment of the present disclosure.

TABLE 14

| | conic coefficients | aspheric coefficients | | | | |
|---|---|---|---|---|---|---|
| | k | A4 | A6 | A8 | A10 | A12 |
| R1 | −9.05781E−01 | 8.61120E−03 | 3.93330E−03 | −5.40110E−03 | 6.23510E−03 | −4.71330E−03 |
| R2 | 1.87017E+01 | −2.64210E−02 | 1.49330E−02 | −4.01040E−03 | −2.63520E−03 | 4.01460E−03 |
| R3 | 1.23849E+01 | −5.27010E−02 | 3.19570E−02 | −1.15120E−02 | 3.25740E−03 | −2.13150E−03 |
| R4 | 3.80884E+00 | −3.55750E−02 | 1.11960E−02 | 3.80880E−02 | −1.03510E−01 | 1.44620E−01 |
| R5 | 2.62276E+01 | −3.36330E−02 | 4.31510E−02 | −2.06180E−01 | 6.35960E−01 | −1.37360E+00 |
| R6 | 3.80760E+03 | −1.94710E−02 | −9.31890E−02 | 4.84730E−01 | −1.50920E+00 | 3.10830E+00 |
| R7 | 4.73657E+01 | −6.11760E−02 | −6.51270E−03 | 6.15430E−02 | −8.27220E−02 | 3.94770E−02 |
| R8 | −4.24447E+02 | −6.99080E−02 | −4.75320E−02 | 1.32710E−01 | −1.82760E−01 | 1.68660E−01 |
| R9 | −1.36706E−01 | 1.12140E−02 | −4.78620E−02 | 5.12610E−02 | −4.13350E−02 | 2.38040E−02 |
| R10 | −1.48974E+00 | 5.18860E−02 | −2.30490E−02 | 1.27200E−02 | −8.98330E−03 | 4.86200E−03 |
| R11 | −1.17916E+01 | −9.54030E−02 | 2.51800E−02 | −2.11570E−03 | −1.77790E−03 | 1.21570E−03 |
| R12 | −2.48860E+00 | −1.00460E−01 | 4.52000E−02 | −1.63010E−02 | 4.52320E−03 | −9.48560E−04 |

TABLE 14-continued

| | conic coefficients | aspheric coefficients | | | | |
|---|---|---|---|---|---|---|
| | k | A14 | A16 | A18 | A20 | A22 |
| R1 | −9.05781E−01 | 2.38190E−03 | −7.55510E−04 | 1.37410E−04 | −1.12620E−05 | −7.93750E−08 |
| R2 | 1.87017E+01 | −2.57090E−03 | 9.13990E−04 | −1.76740E−04 | 1.44540E−05 | 3.39910E−09 |
| R3 | 1.23849E+01 | 1.48590E−03 | −5.20140E−04 | 7.44200E−04 | −1.97820E−06 | −4.05340E−07 |
| R4 | 3.80884E+00 | −1.22120E−01 | 6.19870E−02 | −1.73300E−02 | 2.05850E−03 | −3.78380E−06 |
| R5 | 2.62276E+01 | 2.09040E+00 | −2.26380E+00 | 1.74090E+00 | −9.30550E−01 | 3.26080E−01 |
| R6 | 3.80760E+03 | −4.47080E+00 | 4.60880E+00 | −3.44750E+00 | 1.87380E+00 | −7.32330E−01 |
| R7 | 4.73657E+01 | 3.35920E−02 | −7.16260E−02 | 5.93490E−02 | −2.95540E−02 | 9.57620E−03 |
| R8 | −4.24447E+02 | −1.07940E−01 | 4.86390E−02 | −1.55040E−02 | 3.48880E−03 | −5.48170E−04 |
| R9 | −1.36706E−01 | −9.77360E−03 | 2.88270E−03 | −6.14130E−04 | 9.43400E−05 | −1.03240E−05 |
| R10 | −1.48974E+00 | −1.80700E−03 | 4.66080E−04 | −8.49180E−05 | 1.10080E−05 | −1.00890E−06 |
| R11 | −1.17916E+01 | −4.06290E−04 | 8.53840E−05 | −1.21310E−05 | 1.19970E−06 | −8.30270E−08 |
| R12 | −2.48860E+00 | 1.49930E−04 | −1.78940E−05 | 1.60990E−06 | −1.08190E−07 | 5.32720E−09 |

| | conic coefficients | aspheric coefficients | | | |
|---|---|---|---|---|---|
| | k | A24 | A26 | A28 | A30 |
| R1 | −9.05781E−01 | −2.55890E−08 | −2.34890E−09 | 1.43670E−09 | 7.62450E−10 |
| R2 | 1.87017E+01 | −6.42380E−10 | 4.39270E−09 | −1.74000E−09 | −3.42360E−10 |
| R3 | 1.23849E+01 | −2.06390E−08 | −2.27780E−08 | 2.52710E−08 | 6.28720E−09 |
| R4 | 3.80884E+00 | −3.07080E−06 | −1.14990E−06 | 2.45700E−07 | 6.06440E−07 |
| R5 | 2.62276E+01 | −6.33670E−02 | 1.91590E−03 | 1.71980E−03 | −2.48290E−04 |
| R6 | 3.80760E+03 | 2.00440E−01 | −3.64530E−02 | 3.95580E−03 | −1.93750E−04 |
| R7 | 4.73657E+01 | −2.03890E−03 | 2.75940E−04 | −2.15750E−05 | 7.43180E−07 |
| R8 | −4.24447E+02 | 5.86020E−05 | −4.04380E−06 | 1.61410E−07 | −2.80410E−09 |
| R9 | −1.36706E−01 | 7.83450E−07 | −3.91140E−08 | 1.15430E−09 | −1.52450E−11 |
| R10 | −1.48974E+00 | 6.38570E−08 | −2.65310E−09 | 6.50600E−11 | −7.13050E−13 |
| R11 | −1.17916E+01 | 3.95390E−09 | −1.23680E−10 | 2.29130E−12 | −1.9068E−14 |
| R12 | −2.48860E+00 | −1.85880E−10 | 4.33660E−12 | −6.04820E−14 | 3.80260E−16 |

Table 15 and Table 16 respectively show the design data of the inflection point and stationary point of each lens of the camera optical lens 40 in the fourth embodiment of the present disclosure.

TABLE 15

| | The number of Inflection points | the location 1 of inflection point | the location 2 of inflection point | the location 3 of inflection point | the location 4 of inflection point | the location 5 of inflection point |
|---|---|---|---|---|---|---|
| P1R1 | 1 | 1.645 | | | | |
| P1R2 | 1 | 1.255 | | | | |
| P3R1 | 2 | 0.445 | 1.385 | | | |
| P3R2 | 2 | 0.185 | 1.535 | | | |
| P4R1 | 1 | 1.405 | | | | |
| P4R2 | 3 | 0.255 | 1.545 | 2.095 | | |
| P5R1 | 3 | 1.065 | 2.465 | 3.185 | | |
| P5R2 | 5 | 0.505 | 1.435 | 2.905 | 3.405 | 3.505 |
| P6R1 | 3 | 0.445 | 1.855 | 3.735 | | |
| P6R2 | 1 | 0.775 | | | | |

TABLE 16

| | the number of stationary points | the location 1 of stationary point | the location 2 of stationary point | the location 3 of stationary point |
|---|---|---|---|---|
| P1R2 | 1 | 1.565 | | |
| P3R1 | 1 | 0.745 | | |
| P3R2 | 2 | 0.295 | 1.675 | |
| P4R1 | 1 | 1.965 | | |
| P4R2 | 1 | 0.425 | | |
| P5R1 | 2 | 1.755 | 3.025 | |
| P5R2 | 3 | 1.015 | 1.775 | 3.545 |
| P6R1 | 3 | 0.815 | 3.645 | 3.805 |
| P6R2 | 1 | 1.915 | | |

Figure 14:
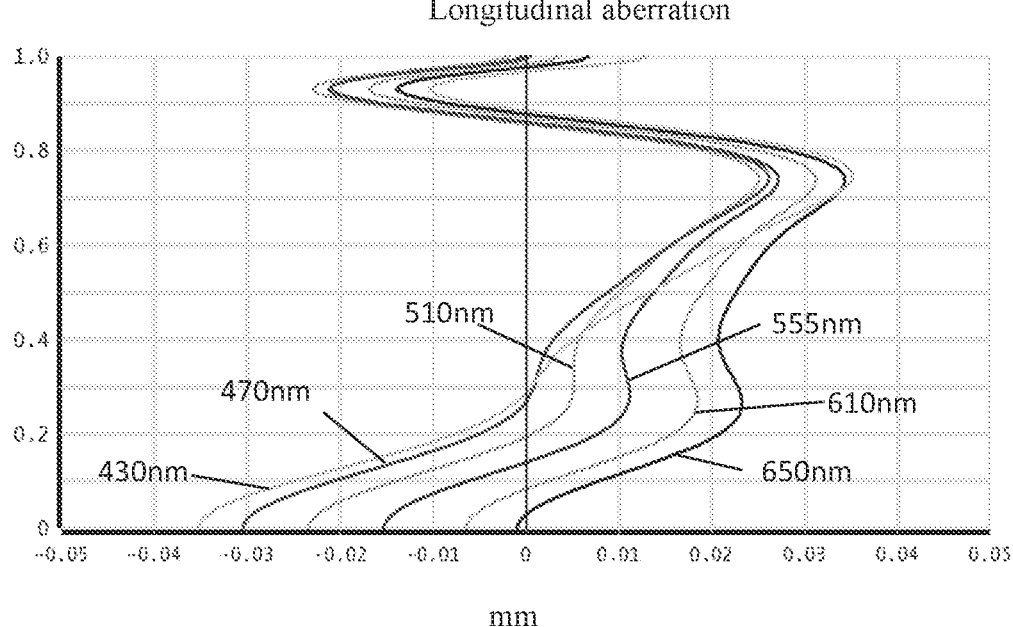
FIG. 14 shows the longitudinal aberration of the camera optical lens shown in FIG. 13.
Figure 15:
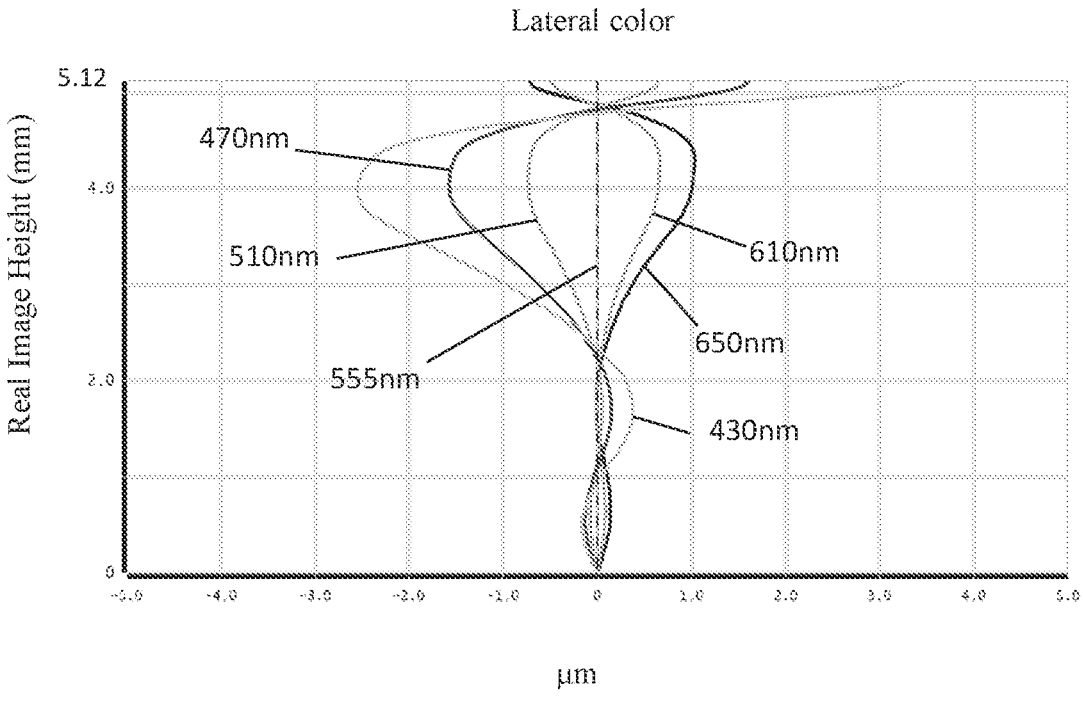
FIG. 15 shows the lateral color of the camera optical lens shown in FIG. 13.
Figure 16:
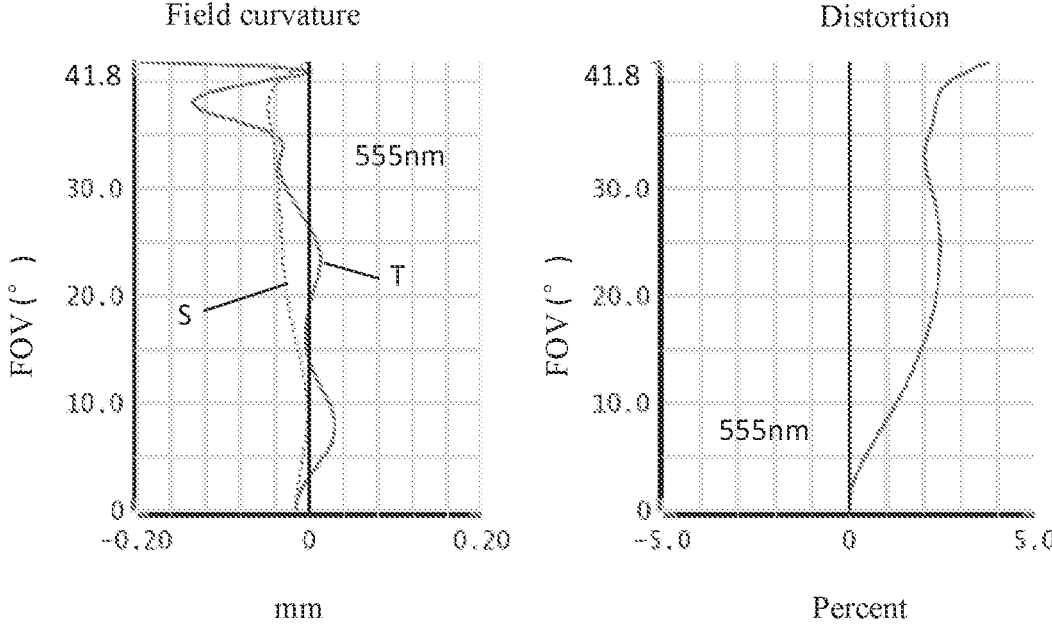
FIG. 16 presents a schematic diagram of the field curvature and distortion of the camera optical lens shown in FIG. 13.

FIG. 14 and FIG. 15 respectively show the longitudinal aberration and lateral color schematic diagrams after light with wavelengths of 650 nm, 610 nm, 555 nm, 510 nm, 470 nm and 430 nm passes through the camera optical lens 40 in the fourth embodiment. FIG. 16 shows the schematic diagrams of the field curvature and distortion after light with a wavelength of 555 nm passes through the camera optical lens 40 in the fourth embodiment. The field curvature S in FIG. 16 is a field curvature in the sagittal direction, and T is the field curvature in the meridian direction.

As shown in Table 25, the fourth embodiment satisfies the various conditions.

In this embodiment, the pupil entering diameter (ENPD) of the camera optical lens 40 is 3.247 mm, the full vision field image height (IH) is 5.120 mm, and the vision field angle (FOV) in the diagonal direction is 83.54°. The camera optical lens 40 can meet the design requirements of large aperture, wide-angle and ultra-thin, and chromatic aberrations on-axis and chromatic aberrations off-axis are adequately corrected. And the camera optical lens 40 has excellent optical characteristics.

Embodiment 5

Embodiment 5 may also be described in the following description as a fifth embodiment. The fifth embodiment is basically the same as the first embodiment, and the meaning of its symbols is the same as the first embodiment, in the following, only the differences are described.

Figure 17:
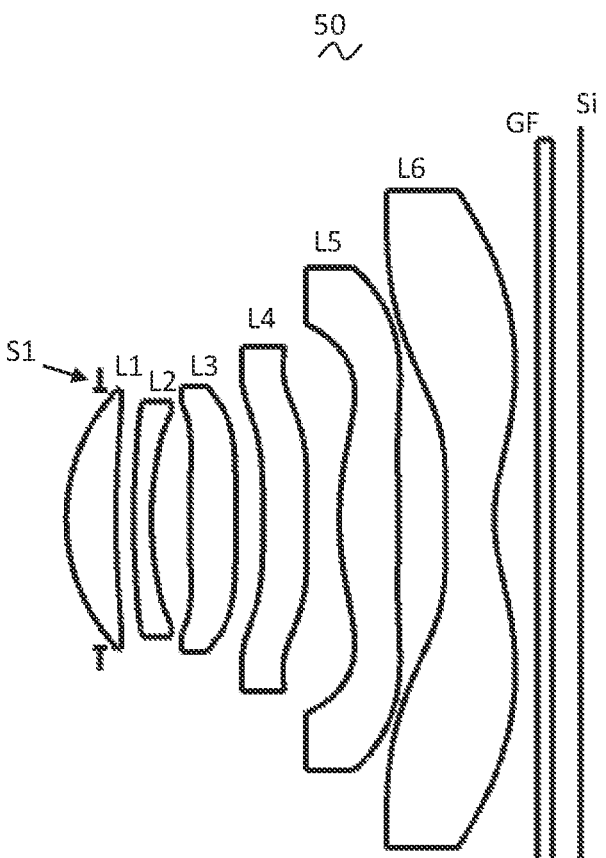
FIG. 17 is a schematic diagram of a camera optical lens in accordance with a fifth embodiment of the present disclosure.

FIG. 17 shows the camera optical lens 50 in the fifth embodiment of the present disclosure.

Table 17 shows the design data of the camera optical lens 50 in the fifth embodiment of the present disclosure.

TABLE 17

| | R | d | | nd | | vd |
|------|------|------|-----|--------|-----|--------|
| S1 | ∞ | d0= | −0.468 | | | |
| R1 | 2.425 | d1= | 0.680 | nd1 | 1.5444 | V1 | 55.82 |
| R2 | 9.442 | d2= | 0.244 | | | |

TABLE 17-continued

| | R | d | | nd | | vd |
|------|---------|------|-------|------|--------|-----|--------|
| R3 | 7.012 | d3= | 0.252 | nd2 | 1.6700 | V2 | 19.39 |
| R4 | 3.857 | d4= | 0.526 | | | |
| R5 | 12.628 | d5= | 0.640 | nd3 | 1.5444 | V3 | 55.82 |
| R6 | −514.035 | d6= | 0.376 | | | |
| R7 | −69.344 | d7= | 0.600 | nd4 | 1.5661 | V4 | 37.71 |
| R8 | 18.292 | d8= | 0.458 | | | |
| R9 | 4.043 | d9= | 0.819 | nd5 | 1.5444 | V5 | 55.82 |
| R10 | −10.594 | d10= | 0.638 | | | |
| R11 | 12.333 | d11= | 0.677 | nd6 | 1.5346 | V6 | 55.69 |
| R12 | 1.910 | d12= | 0.604 | | | |
| R13 | ∞ | d13= | 0.210 | ndg | 1.5168 | vg | 64.17 |
| R14 | ∞ | d14= | 0.378 | | | |

Table 18 shows the aspheric data of each lens of the camera optical lens 50 in the fifth embodiment of the present disclosure.

TABLE 18

| | conic coefficients | aspheric coefficients | | | | |
|-----|--------------|--------------|--------------|--------------|--------------|--------------|
| | k | A4 | A6 | A8 | A10 | A12 |
| R1 | −8.76559E−01 | 7.58620E−03 | 4.46210E−03 | −5.23410E−03 | 6.19570E−03 | −4.73430E−03 |
| R2 | 2.09552E+01 | −2.31900E−02 | 1.33510E−02 | −4.43640E−03 | −2.57670E−03 | 4.05830E−03 |
| R3 | 1.18937E+01 | −5.39930E−02 | 3.22830E−02 | −1.13900E−02 | 3.28210E−03 | −2.14600E−03 |
| R4 | 3.75577E+00 | −3.96390E−02 | 1.37910E−02 | 3.86000E−02 | −1.03640E−01 | 1.44410E−01 |
| R5 | 2.72781E+01 | −2.81150E−02 | 4.30660E−02 | −2.06800E−01 | 6.35760E−01 | −1.37370E+00 |
| R6 | 2.34616E+04 | −2.34550E−02 | −9.39010E−02 | 4.84930E−01 | −1.50940E+00 | 3.10820E+00 |
| R7 | 8.04874E+02 | −6.32880E−02 | −8.97180E−03 | 6.18030E−02 | −8.26570E−02 | 3.94890E−02 |
| R8 | −5.98146E+01 | −6.41350E−02 | −4.77970E−02 | 1.32670E−01 | −1.82750E−01 | 1.68660E−01 |
| R9 | 2.03020E−01 | 1.21440E−02 | −4.84100E−02 | 5.12180E−02 | −4.13410E−02 | 2.38030E−02 |
| R10 | 5.36127E−01 | 4.99330E−02 | −2.29300E−02 | 1.27220E−02 | −8.98340E−03 | 4.86190E−03 |
| R11 | −5.57317E+00 | −9.51100E−02 | 2.51660E−02 | −2.11580E−03 | −1.77780E−03 | 1.21570E−03 |
| R12 | −2.37364E+00 | −9.96650E−02 | 4.51820E−02 | −1.62980E−02 | 4.52320E−03 | −9.48560E−04 |

| | conic coefficients | aspheric coefficients | | | | |
|-----|--------------|--------------|--------------|--------------|--------------|--------------|
| | k | A14 | A16 | A18 | A20 | A22 |
| R1 | −8.76559E−01 | 2.37500E−03 | −7.57840E−04 | 1.37950E−04 | −1.12340E−05 | −9.11160E−09 |
| R2 | 2.09552E+01 | −2.55780E−03 | 9.15220E−04 | −1.78140E−04 | 1.42820E−05 | −2.05150E−07 |
| R3 | 1.18937E+01 | 1.48950E−03 | −5.18100E−04 | 7.69790E−05 | −9.79890E−07 | 1.71920E−07 |
| R4 | 3.75577E+00 | −1.22190E−01 | 6.19850E−02 | −1.73470E−02 | 2.05830E−03 | 5.72400E−06 |
| R5 | 2.72781E+01 | 2.09040E+00 | −2.26380E+00 | 1.74090E+00 | −9.30550E−01 | 3.26100E−01 |
| R6 | 2.34616E+04 | −4.47080E+00 | 4.60880E+00 | −3.44750E+00 | 1.87380E+00 | −7.32330E−01 |
| R7 | 8.04874E+02 | 3.35960E−02 | −7.16260E−02 | 5.93490E−02 | −2.95540E−02 | 9.57620E−03 |
| R8 | −5.98146E+01 | −1.07940E−01 | 4.86390E−02 | −1.55040E−02 | 3.48880E−03 | −5.48170E−04 |
| R9 | 2.03020E−01 | −9.77360E−03 | 2.88270E−03 | −6.14130E−04 | 9.43400E−05 | −1.03240E−05 |
| R10 | 5.36127E−01 | −1.80700E−03 | 4.66080E−04 | −8.49180E−05 | 1.10080E−05 | −1.00890E−06 |
| R11 | −5.57317E+00 | −4.06290E−04 | 8.53840E−05 | −1.21310E−05 | 1.19970E−06 | −8.30270E−08 |
| R12 | −2.37364E+00 | 1.49930E−04 | −1.78940E−05 | 1.60990E−06 | −1.08190E−07 | 5.32720E−09 |

| | conic coefficients | aspheric coefficients | | | |
|-----|--------------|--------------|--------------|--------------|--------------|
| | k | A24 | A26 | A28 | A30 |
| R1 | −8.76559E−01 | 3.40440E−09 | 9.04740E−10 | −3.21290E−09 | −1.15230E−09 |
| R2 | 2.09552E+01 | −4.85740E−09 | 2.75630E−09 | 2.03250E−09 | 5.26620E−10 |
| R3 | 1.18937E+01 | −8.59890E−08 | −2.32860E−09 | −4.03950E−08 | 1.56220E−08 |
| R4 | 3.75577E+00 | 4.37810E−06 | 3.32460E−07 | −2.68210E−07 | −4.53900E−07 |
| R5 | 2.72781E+01 | −6.33860E−02 | 1.92060E−03 | 1.71980E−03 | −2.48330E−04 |
| R6 | 2.34616E+04 | 2.00440E−01 | −3.64530E−02 | 3.95580E−03 | −1.93750E−04 |
| R7 | 8.04874E+02 | −2.03890E−03 | 2.75940E−04 | −2.15750E−05 | 7.43150E−07 |
| R8 | −5.98146E+01 | 5.86030E−05 | −4.04380E−06 | 1.61410E−07 | −2.80510E−09 |
| R9 | 2.03020E−01 | 7.83440E−07 | −3.91140E−08 | 1.15430E−09 | −1.52460E−11 |
| R10 | 5.36127E−01 | 6.38570E−08 | −2.65310E−09 | 6.50600E−11 | −7.13060E−13 |

TABLE 18-continued

| | | | | |
|---|---|---|---|---|
| R11 | −5.57317E+00 | 3.95390E−09 | −1.23680E−10 | 2.29130E−12 | −1.9068E−14 |
| R12 | −2.37364E+00 | −1.85880E−10 | 4.33660E−12 | −6.04820E−14 | 3.80260E−16 |

Table 19 and Table 20 respectively show the design data of the inflection point and stationary point of each lens of the camera optical lens 50 in the fifth embodiment of the present disclosure.

TABLE 19

| | The number of inflection points | the location 1 of inflection point | the location 2 of inflection point | the location 3 of inflection point |
|---|---|---|---|---|
| P1R1 | 1 | 1.565 | | |
| P1R2 | 1 | 1.255 | | |
| P3R1 | 3 | 0.545 | 1.445 | 1.495 |
| P3R2 | 2 | 1.635 | 1.715 | |
| P4R1 | 2 | 1.395 | 1.975 | |
| P4R2 | 3 | 0.255 | 1.515 | 2.255 |
| P5R1 | 1 | 1.025 | | |
| P5R2 | 2 | 0.445 | 1.415 | |
| P6R1 | 3 | 0.275 | 1.825 | 4.065 |
| P6R2 | 1 | 0.785 | | |

TABLE 20

| | the number of stationary points | the location 1 of stationary point | the location 2 of stationary point | the location 3 of stationary point |
|---|---|---|---|---|
| P1R2 | 1 | 1.585 | | |
| P3R1 | 1 | 0.885 | | |
| P4R1 | 2 | 1.915 | 2.015 | |
| P4R2 | 3 | 0.435 | 1.995 | 2.385 |
| P5R1 | 1 | 1.645 | | |
| P5R2 | 2 | 0.845 | 1.825 | |
| P6R1 | 3 | 0.485 | 3.865 | 4.115 |
| P6R2 | 1 | 1.975 | | |

Figure 18:
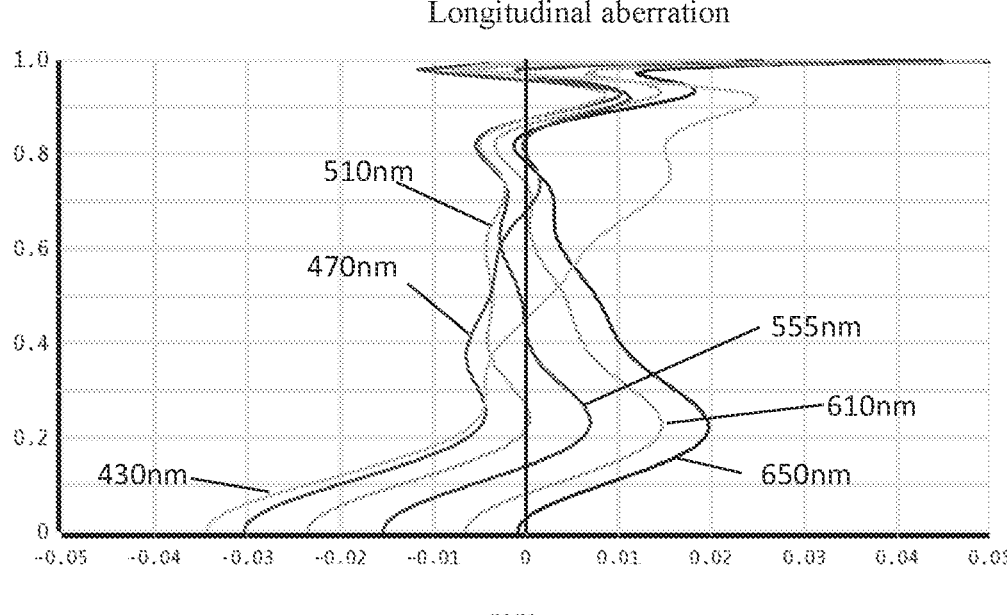
FIG. 18 shows the longitudinal aberration of the camera optical lens shown in FIG. 17.
Figure 19:
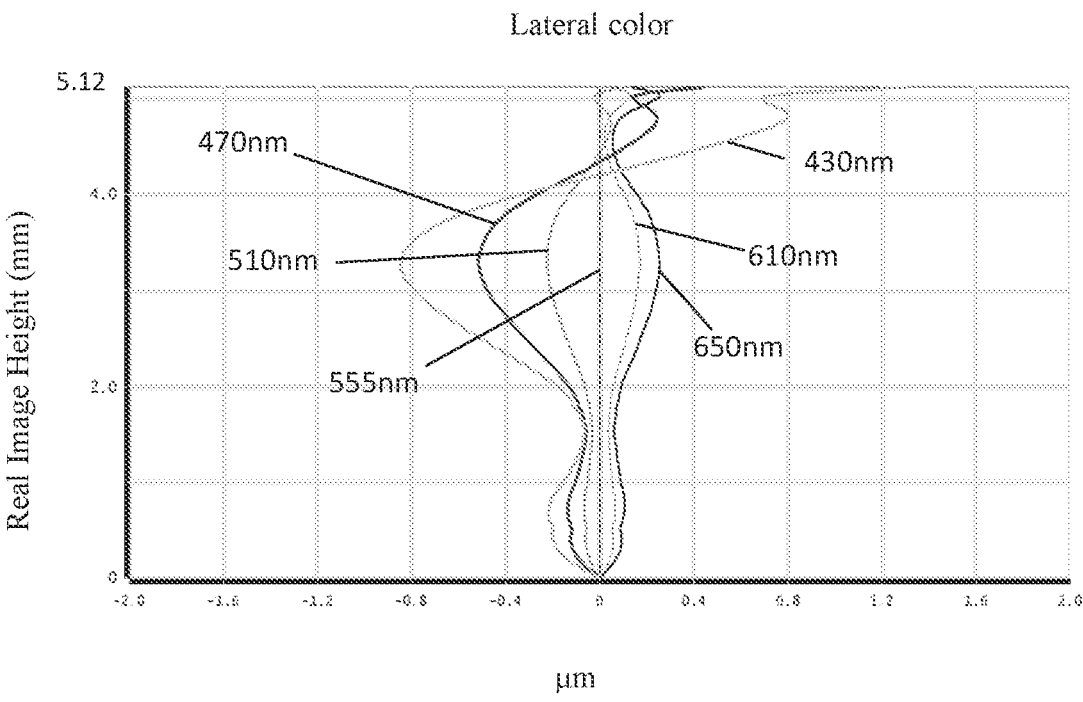
FIG. 19 shows the lateral color of the camera optical lens shown in FIG. 17.
Figure 20:
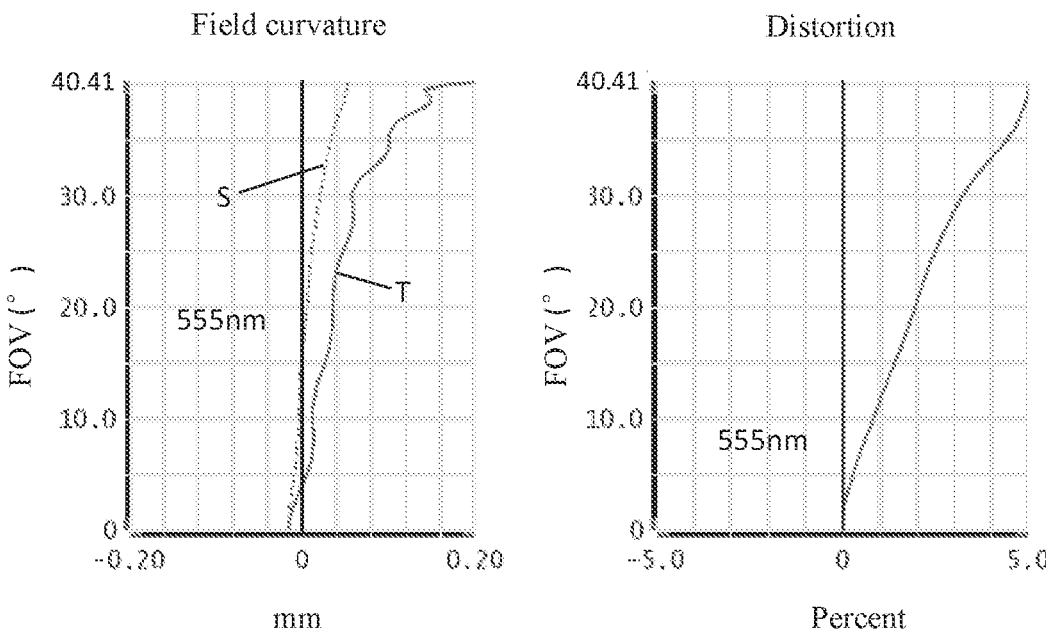
FIG. 20 presents a schematic diagram of the field curvature and distortion of the camera optical lens shown in FIG. 17.

FIG. 18 and FIG. 19 respectively show the longitudinal aberration and lateral color schematic diagrams after light with wavelengths of 650 nm, 610 nm, 555 nm, 510 nm, 470 nm and 430 nm passes through the camera optical lens 50 in the fifth embodiment. FIG. 20 shows the schematic diagrams of the field curvature and distortion after light with a wavelength of 555 nm passes through the camera optical lens 50 in the fifth embodiment. The field curvature S of FIG. 20 is a field curvature in the sagittal direction, and T is the field curvature in the meridian direction.

As shown in Table 25, the fifth embodiment satisfies the various conditions.

In this embodiment, the pupil entering diameter (ENPD) of the camera optical lens 50 is 3.366 mm, the full vision field image height (IH) is 5.120 mm, and the vision field angle (FOV) in the diagonal direction is 80.82°. The camera optical lens 50 can meet the design requirements of large aperture, wide-angle and ultra-thin, and chromatic aberrations on-axis and chromatic aberrations off-axis are adequately corrected. And the camera optical lens 50 has excellent optical characteristics.

A Contrast Embodiment

The meaning of symbols in the contrast embodiment is the same as the first embodiment. Only the differences are described below.

Figure 21:
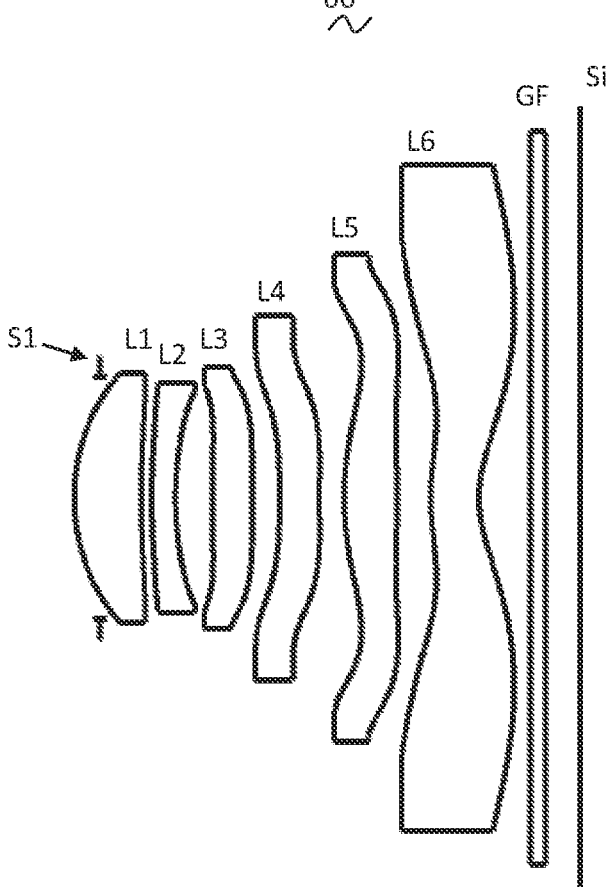
FIG. 21 is a schematic diagram of a camera optical lens in accordance with a comparative embodiment of the present disclosure.

FIG. 21 shows the camera optical lens 60 in the contrast embodiment.

Table 21 shows the design data of the camera optical lens 60 in the contrast embodiment.

TABLE 21

| | R | d | | nd | | vd |
|---|---|---|---|---|---|---|
| S1 | ∞ | d0= | −0.357 | | | |
| R1 | 2.450 | d1= | 0.926 | nd1 | 1.5444 V1 | 55.82 |
| R2 | 10.111 | d2= | 0.146 | | | |
| R3 | 7.098 | d3= | 0.328 | nd2 | 1.6700 V2 | 19.39 |
| R4 | 3.886 | d4= | 0.511 | | | |
| R5 | 14.135 | d5= | 0.549 | nd3 | 1.5444 V3 | 55.82 |
| R6 | 660.865 | d6= | 0.376 | | | |
| R7 | −18.286 | d7= | 0.553 | nd4 | 1.5661 V4 | 37.71 |
| R8 | 13.930 | d8= | 0.344 | | | |
| R9 | 3.832 | d9= | 0.731 | nd5 | 1.5444 V5 | 55.82 |
| R10 | −9.149 | d10= | 0.463 | | | |
| R11 | 2.883 | d11= | 0.666 | nd6 | 1.5346 V6 | 55.69 |
| R12 | 1.466 | d12= | 0.710 | | | |
| R13 | ∞ | d13= | 0.210 | ndg | 1.5168 vg | 64.17 |
| R14 | ∞ | d14= | 0.489 | | | |

Table 22 shows the aspheric data of each lens of the camera optical lens 60 in the contrast embodiment.

TABLE 22

| | conic coefficients | aspheric coefficients | | | | |
|---|---|---|---|---|---|---|
| | k | A4 | A6 | A8 | A10 | A12 |
| R1 | −9.33071E−01 | 7.62420E−03 | 4.21960E−03 | −5.32250E−03 | 6.20600E−03 | −4.72980E−03 |
| R2 | 1.46342E+01 | −2.61610E−02 | 1.45480E−02 | −4.21720E−03 | −2.61460E−03 | 4.00810E−03 |
| R3 | 1.07858E+01 | −5.34230E−02 | 3.18500E−02 | −1.15200E−02 | 3.21200E−03 | −2.12600E−03 |
| R4 | 3.72415E+00 | −3.55770E−02 | 1.17990E−02 | 3.79800E−02 | −1.03670E−01 | 1.44610E−01 |
| R5 | −3.86271E+00 | −3.24100E−02 | 4.33230E−02 | −2.06000E−01 | 6.35670E−01 | −1.37360E+00 |
| R6 | 1.45993E+05 | −2.25080E−02 | −9.35900E−02 | 4.84600E−01 | −1.50920E+00 | 3.10830E+00 |
| R7 | −5.34546E+01 | −5.91760E−02 | −9.07650E−03 | 6.17580E−02 | −8.26730E−02 | 3.94900E−02 |
| R8 | −3.16031E+02 | −6.52590E−02 | −4.78070E−02 | 1.32710E−01 | −1.82740E−01 | 1.68660E−01 |
| R9 | −4.44577E−02 | 1.24680E−02 | −4.80570E−02 | 5.12480E−02 | −4.13320E−02 | 2.38040E−02 |
| R10 | −3.57787E+00 | 5.21260E−02 | −2.31070E−02 | 1.27030E−02 | −8.98420E−03 | 4.86200E−03 |
| R11 | −4.92764E+00 | −9.78310E−02 | 2.51620E−02 | −2.11570E−03 | −1.77760E−03 | 1.21570E−03 |
| R12 | −2.28241E+00 | −9.87720E−02 | 4.52260E−02 | −1.63000E−02 | 4.52320E−03 | −9.48570E−04 |

TABLE 22-continued

| | conic coefficients | aspheric coefficients | | | | |
|---|---|---|---|---|---|---|
| | k | A14 | A16 | A18 | A20 | A22 |
| R1 | −9.33071E−01 | 2.37200E−03 | −7.56280E−04 | 1.38080E−04 | −1.12040E−05 | −2.36710E−08 |
| R2 | 1.46342E+01 | −2.56700E−03 | 9.15060E−04 | −1.78350E−04 | 1.43390E−05 | −2.24220E−07 |
| R3 | 1.07858E+01 | 1.47420E−03 | −5.23960E−04 | 7.06870E−05 | 1.54930E−06 | −8.75810E−07 |
| R4 | 3.72415E+00 | −1.22200E−01 | 6.19810E−02 | −1.73360E−02 | 2.05450E−03 | −5.74580E−07 |
| R5 | −3.86271E+00 | 2.09030E+00 | −2.26390E+00 | 1.74100E+00 | −9.30570E−01 | 3.26110E−01 |
| R6 | 1.45993E+05 | −4.47090E+00 | 4.60880E+00 | −3.44750E+00 | 1.87380E+00 | −7.32330E−01 |
| R7 | −5.34546E+01 | 3.35950E−02 | −7.16260E−02 | 5.93490E−02 | −2.95540E−02 | 9.57620E−03 |
| R8 | −3.16031E+02 | −1.07940E−01 | 4.86390E−02 | −1.55040E−02 | 3.48880E−03 | −5.48170E−04 |
| R9 | −4.44577E−02 | −9.77360E−03 | 2.88270E−03 | −6.14130E−04 | 9.43400E−05 | −1.03240E−05 |
| R10 | −3.57787E+00 | −1.80700E−03 | 4.66080E−04 | −8.49180E−05 | 1.10080E−05 | −1.00890E−06 |
| R11 | −4.92764E+00 | −4.06290E−04 | 8.53840E−05 | −1.21310E−05 | 1.19970E−06 | −8.30270E−08 |
| R12 | −2.28241E+00 | 1.49930E−04 | −1.78940E−05 | 1.60990E−06 | −1.08190E−07 | 5.32720E−09 |

| | conic coefficients | aspheric coefficients | | | |
|---|---|---|---|---|---|
| | k | A24 | A26 | A28 | A30 |
| R1 | −9.33071E−01 | −1.84820E−08 | −3.98730E−09 | −4.84100E−10 | 8.69760E−10 |
| R2 | 1.46342E+01 | 2.79890E−08 | −5.19190E−08 | 1.19860E−08 | 9.94010E−09 |
| R3 | 1.07858E+01 | 7.18520E−08 | 6.06090E−08 | 2.19920E−08 | 2.19630E−09 |
| R4 | 3.72415E+00 | 1.07960E−06 | 1.54610E−06 | 1.41010E−07 | −3.17840E−07 |
| R5 | −3.86271E+00 | −6.33790E−02 | 1.91660E−03 | 1.71960E−03 | −2.48160E−04 |
| R6 | 1.45993E+05 | 2.00440E−01 | −3.64530E−02 | 3.95580E−03 | −1.93750E−04 |
| R7 | −5.34546E+01 | −2.03890E−03 | 2.75940E−04 | −2.15750E−05 | 7.43160E−07 |
| R8 | −3.16031E+02 | 5.86030E−05 | −4.04370E−06 | 1.61410E−07 | −2.80510E−09 |
| R9 | −4.44577E−02 | 7.83440E−07 | −3.91140E−08 | 1.15430E−09 | −1.52440E−11 |
| R10 | −3.57787E+00 | 6.38570E−08 | −2.65310E−09 | 6.50600E−11 | −7.13040E−13 |
| R11 | −4.92764E+00 | 3.95390E−09 | −1.23680E−10 | 2.29130E−12 | −1.9068E−14 |
| R12 | −2.28241E+00 | −1.85880E−10 | 4.33660E−12 | −6.04820E−14 | 3.80260E−16 |

Table 23 and Table 24 respectively show the design data of the inflection point and stationary point of each lens of the camera optical lens 60 in the contrast embodiment.

TABLE 23

| | The number of inflection points | the location 1 of inflection point | the location 2 of inflection point | the location 3 of inflection point |
|---|---|---|---|---|
| P1R1 | 1 | 1.615 | | |
| P1R2 | 1 | 1.065 | | |
| P3R1 | 2 | 0.465 | 1.405 | |
| P3R2 | 2 | 0.075 | 1.565 | |
| P4R1 | 2 | 1.395 | 1.995 | |
| P4R2 | 3 | 0.275 | 1.515 | 2.195 |
| P5R1 | 2 | 1.075 | 2.445 | |
| P5R2 | 3 | 0.465 | 1.455 | 2.845 |
| P6R1 | 2 | 0.545 | 1.935 | |
| P6R2 | 2 | 0.845 | 4.025 | |

TABLE 24

| | the number of stationary points | the location 1 of stationary point | the location 2 of stationary point | the location 3 of stationary point |
|---|---|---|---|---|
| P1R2 | 1 | 1.435 | | |
| P3R1 | 1 | 0.775 | | |
| P3R2 | 2 | 0.125 | 1.705 | |
| P4R2 | 3 | 0.465 | 2.105 | 2.255 |

TABLE 24-continued

| | the number of stationary points | the location 1 of stationary point | the location 2 of stationary point | the location 3 of stationary point |
|---|---|---|---|---|
| P5R1 | 2 | 1.755 | 2.885 | |
| P5R2 | 3 | 0.905 | 1.855 | 3.135 |
| P6R1 | 2 | 1.055 | 3.565 | |
| P6R2 | 1 | 2.485 | | |

Figure 22:
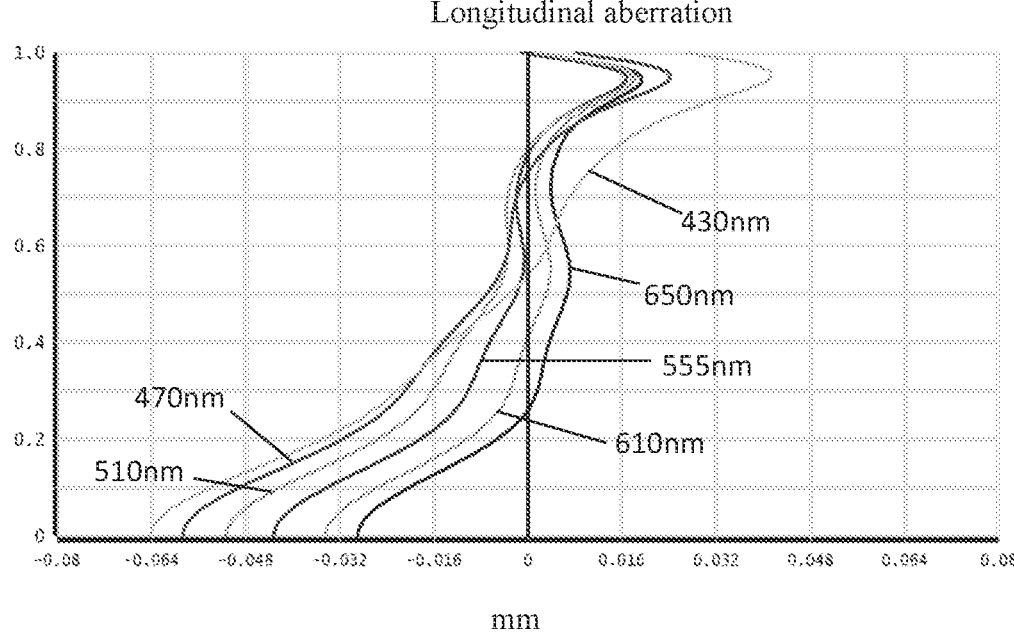
FIG. 22 shows the longitudinal aberration of the camera optical lens shown in FIG. 21.
Figure 23:
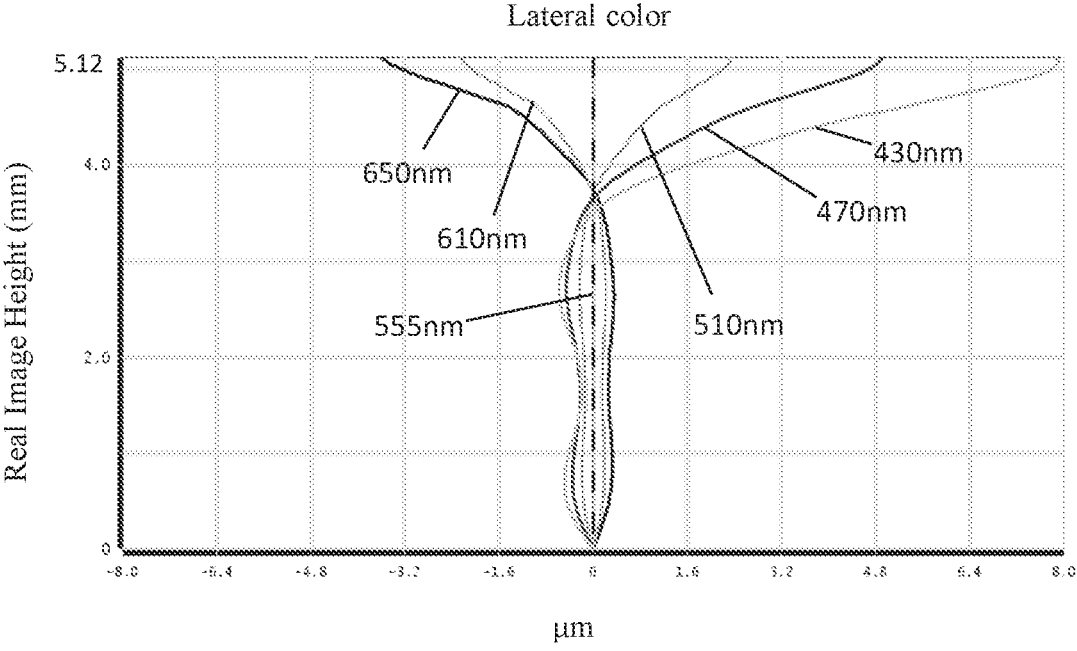
FIG. 23 shows the lateral color of the camera optical lens shown in FIG. 21.
Figure 24:
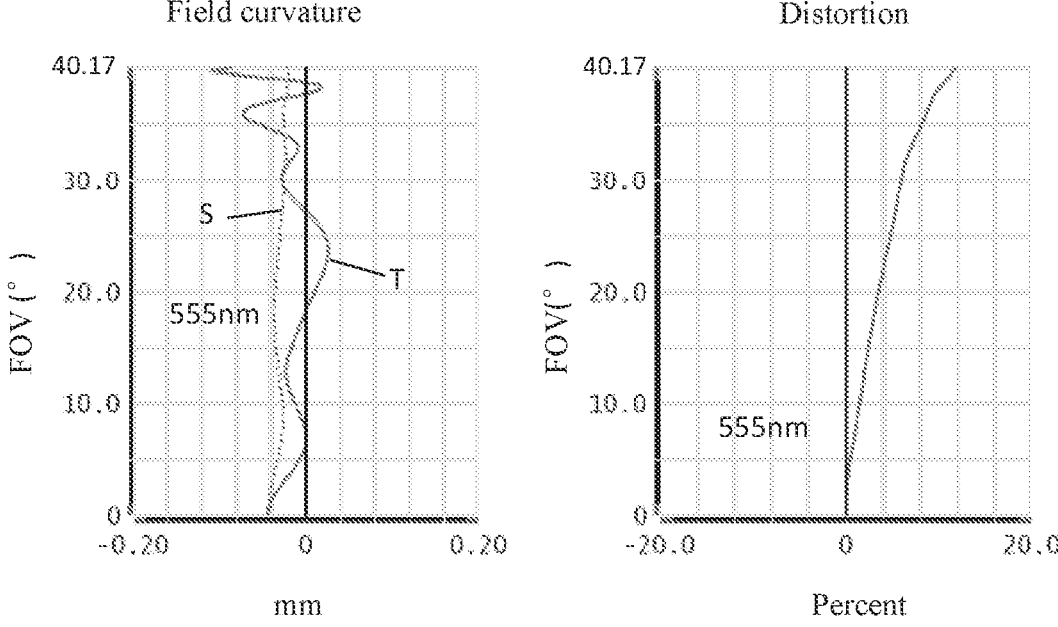
FIG. 24 presents a schematic diagram of the field curvature and distortion of the camera optical lens shown in FIG. 21.

FIG. 22 and FIG. 23 respectively show the longitudinal aberration and lateral color schematic diagrams after light with wavelengths of 650 nm, 610 nm, 555 nm, 510 nm, 470 nm and 430 nm passes through the camera optical lens 60 in the contrast embodiment. FIG. 24 shows the schematic diagrams of the field curvature and distortion after light with a wavelength of 555 nm passes through the camera optical lens 60 in the contrast embodiment. The field curvature S in FIG. 24 a field curvature in the sagittal direction, and T is the field curvature in the meridian direction.

Table 25 below shows the various values in this embodiment in accordance with the above conditions. Obviously, the camera optical lens 60 in this embodiment does not satisfy the above condition: −2.00≤f5/f6≤−0.79.

In the contrast embodiment, the pupil entering diameter (ENPD) of the camera optical lens 60 is 3.162 mm, the full vision field image height (IH) is 5.120 mm, and the vision field angle (FOV) in the diagonal direction is 80.340. The camera optical lens 60 does not meet the design requirements of large aperture, wide-angle and ultra-thin.

TABLE 25

| Parameters and conditions | Embodiment 1 | Embodiment 2 | Embodiment 3 | Embodiment 4 | Embodiment 5 | the contrast embodiment |
|---|---|---|---|---|---|---|
| f3/f | 4.386 | 2.050 | 4.688 | 5.936 | 3.959 | 4.935 |
| f5/f6 | −1.238 | −1.250 | −1.968 | −0.791 | −1.267 | −0.759 |
| R9/R10 | −0.455 | −0.893 | −0.203 | −0.457 | −0.382 | −0.419 |
| d2/d3 | 0.466 | 0.257 | 0.388 | 0.419 | 0.969 | 0.446 |
| R7/R8 | −1.838 | −1.790 | −4.990 | −1.011 | −3.791 | −1.313 |
| d1/TTL | 0.133 | 0.142 | 0.149 | 0.130 | 0.096 | 0.132 |
| f4/d7 | −41.70 | −25.30 | −79.49 | −25.55 | −42.33 | −25.00 |
| f1 | 5.751 | 6.061 | 5.366 | 5.568 | 5.775 | 5.677 |
| f2 | −13.275 | −11.432 | −13.827 | −12.815 | −13.098 | −13.242 |
| f3 | 25.573 | 12.625 | 26.448 | 32.655 | 22.577 | 26.438 |
| f4 | −23.850 | −15.557 | −43.570 | −13.716 | −25.383 | −13.814 |
| f5 | 5.399 | 5.414 | 7.351 | 4.808 | 5.466 | 5.045 |
| f6 | −4.362 | −4.331 | −3.735 | −6.078 | −4.313 | −6.649 |
| f12 | 8.575 | 10.018 | 7.658 | 8.289 | 8.916 | 8.427 |
| FNO | 1.694 | 1.694 | 1.694 | 1.694 | 1.694 | 1.694 |
| TTL | 7.192 | 7.411 | 6.895 | 6.973 | 7.102 | 7.002 |
| IH | 5.120 | 5.120 | 5.120 | 5.120 | 5.120 | 5.120 |
| FOV | 81.30 | 76.44 | 80.00 | 83.54 | 80.82 | 80.34 |

It can be understood by a person of ordinary skill in the art that the above embodiments are specific embodiments of the realization of the present disclosure, and that various changes can be made thereto in form and detail in practical application without departing from the spirit and scope of the present disclosure.

What is claimed is:

1. A camera optical lens, comprising, from an object side to an image side in sequence:
   a first lens having a positive refractive power;
   a second lens having a negative refractive power;
   a third lens having a positive refractive power;
   a fourth lens having a negative refractive power;
   a fifth lens having a positive refractive power;
   a sixth lens having a negative refractive power;
   wherein the camera lens satisfies the following conditions:

$$2.00 \le f3/f \le 6.00;$$
$$-2.00 \le f5/f6 \le -0.79;$$
$$-5.00 \le R7/R8 \le -1.00;$$
$$-0.90 \le R9/R10 \le -0.20;$$
$$0.25 \le d2/d3 \le 1.00;$$

where,
f represents a focal length of the camera optical lens;
f3 represents a focal length of the third lens;
f5 represents a focal length of the fifth lens;
f6 represents a focal length of the sixth lens;
R7 represents a central curvature radius of the object side surface of the fourth lens;
R8 represents a central curvature radius of the image side surface of the fourth lens;
R9 represents a central curvature radius of the object side surface of the fifth lens;
R10 represents a central curvature radius of the image side surface of the fifth lens;
d2 represents a distance on-axis from an image side surface of the first lens to an object side surface of the second lens;
d3 represents a thickness on-axis of the second lens.

2. The camera optical lens according to claim 1, wherein the camera optical lens further satisfies the following conditions:

$$0.09 \le d1/TTL \le 0.15;$$

where,
d1 represents a thickness on-axis of the first lens;
TTL represents a total optical length of the camera optical lens.

3. The camera optical lens according to claim 1, wherein the camera optical lens further satisfies the following conditions:

$$-80.00 \le f4/d7 \le -25.00;$$

where,
f4 represents a focal length of the fourth lens;
d7 represents a thickness on-axis of the fourth lens.

4. The camera optical lens according to claim 1, wherein the first lens has a convex object side surface at the proximal axis and a concave image side surface at the proximal axis; and the camera optical lens further satisfies the following conditions:

$$0.48 \le f1/f \le 1.52;$$
$$-3.55 \le (R1 + R2)/(R1 - R2) \le -1.09;$$

where,
f1 represents a focal length of the first lens;
R1 represents a central curvature radius of the object side surface of the first lens;
R2 represents a central curvature radius of the image side surface of the first lens.

5. The camera optical lens according to claim 1, wherein the second lens has a convex object side surface at the proximal axis and a concave image side surface at the proximal axis; and the camera optical lens further satisfies the following conditions:

$$-4.90 \le f2/f \le -1.24;$$

$$1.36 \le (R3 + R4)/(R3 - R4) \le 5.66;$$

$$0.02 \le d3/TTL \le 0.09;$$

where, f2 represents a focal length of the second lens;

R3 represents a central curvature radius of the object side surface of the second lens;

R4 represents a central curvature radius of the image side surface of the second lens;

TTL represents a total optical length of the camera optical lens.

6. The camera optical lens according to claim 1, wherein the third lens has a convex object side surface at the proximal axis; and the camera optical lens further satisfies the following conditions:

$$-2.65 \le (R5 + R6)/(R5 - R6) \le -0.51;$$

$$0.03 \le d5/TTL \le 0.16;$$

where,

R5 represents a central curvature radius of the object side surface of the third lens;

R6 represents a central curvature radius of the image side surface of the third lens;

d5 represents a thickness on-axis of the third lens;

TTL represents a total optical length of the camera optical lens.

7. The camera optical lens according to claim 1, wherein the fourth lens has a concave object side surface at the proximal axis and a concave image side surface at the proximal axis; and the camera optical lens further satisfies the following conditions:

$$-15.45 \le f4/f \le -1.66;$$

$$0.00 \le (R7 + R8)/R7 \le 1.00;$$

$$0.04 \le d7/TTL \le 0.13;$$

where, f4 represents a focal length of the fourth lens;

d7 represents a thickness on-axis of the fourth lens;

TTL represents a total optical length of the camera optical lens.

8. The camera optical lens according to claim 1, wherein the fifth lens has a convex object side surface at the proximal axis and a convex image side surface at the proximal axis; and the camera optical lens further satisfies the following conditions:

$$0.44 \le f5/f \le 1.95;$$

$$-1.32 \le (R9 + R10)/(R9 - R10) \le -0.04;$$

$$0.05 \le d9/TTL \le 0.17;$$

where, d9 represents a thickness on-axis of the fifth lens;

TTL represents a total optical length of the camera optical lens.

9. The camera optical lens according to claim 1, wherein the sixth lens has a convex object side surface at the proximal axis and a concave image side surface at the proximal axis; and the camera optical lens further satisfies the following conditions:

$$-2.21 \le f6/f \le -0.44;$$

$$0.50 \le (R11 + R12)/(R11 - R12) \le 3.53;$$

$$0.04 \le d11/TTL \le 0.15;$$

where,

R11 represents a central curvature radius of the object side surface of the sixth lens;

R12 represents a central curvature radius of the image side surface of the sixth lens;

d11 represents a thickness on-axis of the sixth lens;

TTL represents a total optical length of the camera optical lens.

10. The camera optical lens according to claim 1, wherein the camera optical lens has a field of view; and the camera optical lens further satisfies the following conditions:

$$FOV \ge 76.4°;$$

FOV represents the field of view of the camera optical lens.

* * * * *